US011898526B2

(12) United States Patent
Dantes et al.

(10) Patent No.: US 11,898,526 B2
(45) Date of Patent: Feb. 13, 2024

(54) FUEL INJECTOR VALVE SEAT ASSEMBLY INCLUDING INSERT LOCATING AND RETENTION FEATURES

(71) Applicant: Robert Bosch GmbH, Stuttgart (DE)

(72) Inventors: Guenter Dantes, Eberdingen (DE); Todd Wallace Helsel, Saint Stephen, SC (US); Manoj Menon, Novi, MI (US); John Seifert, Kalkaska, MI (US); Thomas Stach, Northville, MI (US); Ryan Cary, Ferndale, MI (US); Sudhir Srinivasan, Farmington Hills, MI (US); Fabian Lischke, Keego Harbor, MI (US); Juergen Lander, Stuttgart (DE); Sebastian Wieschollek, Ann Arbor, MI (US); James Doetsch, Farmington Hills, MI (US); Peter Glibota, Huntington Woods, MI (US)

(73) Assignee: Robert Bosch GmbH, Stuttgart (DE)

( * ) Notice: Subject to any disclaimer, the term of this patent is extended or adjusted under 35 U.S.C. 154(b) by 564 days.

(21) Appl. No.: 17/049,713

(22) PCT Filed: Apr. 23, 2019

(86) PCT No.: PCT/EP2019/060352
§ 371 (c)(1),
(2) Date: Oct. 22, 2020

(87) PCT Pub. No.: WO2019/206895
PCT Pub. Date: Oct. 31, 2019

(65) Prior Publication Data

US 2021/0140399 A1 May 13, 2021

Related U.S. Application Data

(60) Provisional application No. 62/662,330, filed on Apr. 25, 2018.

(51) Int. Cl.
*F02M 61/16* (2006.01)
*F02M 61/18* (2006.01)

(52) U.S. Cl.
CPC ...... *F02M 61/168* (2013.01); *F02M 61/1853* (2013.01); *F02M 61/1886* (2013.01);
(Continued)

(58) Field of Classification Search
CPC ............. F02M 61/168; F02M 61/1853; F02M 61/1886; F02M 61/18; F02M 61/16;
(Continued)

(56) References Cited

U.S. PATENT DOCUMENTS 2,084,057 A 6/1937 French
5,690,080 A 11/1997 Pelgrim et al.
(Continued)

FOREIGN PATENT DOCUMENTS

DE 102005032998 3/2006
EP 1124057 8/2001
(Continued)

OTHER PUBLICATIONS

PCT International Search Report for PCT/EP2019/060352.

*Primary Examiner* — Christopher R Dandridge
(74) *Attorney, Agent, or Firm* — Kelly McGlashen; Maginot, Moore & Beck LLP

(57) ABSTRACT

A fuel injector (1) including a fuel injector housing (2), a valve seat (4) formed at one end of the fuel injector housing, and a valve body (10) disposed in the fuel injector housing and operable to open and close a spray hole (20) in the valve seat. The valve seat includes a base portion (16) and insert portion (26) having spray holes (8) that is secured to the base portion (16).

2 Claims, 18 Drawing Sheets

FIG. 4

(52) U.S. Cl.
CPC ............... *F02M 2200/8015* (2013.01); *F02M 2200/8023* (2013.01); *F02M 2200/8061* (2013.01); *F02M 2200/8084* (2013.01)

(58) Field of Classification Search
CPC ... F02M 2200/8015; F02M 2200/8023; F02M 2200/8061; F02M 2200/8084
See application file for complete search history.

(56) References Cited

U.S. PATENT DOCUMENTS

| | | | | |
|---|---|---|---|---|
| 6,783,085 | B2 | 8/2004 | Xu | |
| 6,991,188 | B2 | 1/2006 | Kobayashi et al. | |
| 7,021,570 | B2 | 4/2006 | Tani et al. | |
| 7,059,549 | B2 | 6/2006 | Xu | |
| 7,334,563 | B2 | 2/2008 | Mifuji et al. | |
| 2002/0008166 | A1 | 1/2002 | Fukaya et al. | |
| 2003/0085309 | A1* | 5/2003 | Iwano | F02M 61/18 239/585.1 |
| 2005/0133640 | A1* | 6/2005 | Hornby | F02M 51/0625 239/585.1 |
| 2006/0113406 | A1 | 6/2006 | Ganser | |
| 2016/0097361 | A1 | 4/2016 | Noguchi | |
| 2016/0258408 | A1 | 9/2016 | Noguchi | |

FOREIGN PATENT DOCUMENTS

| | | |
|---|---|---|
| EP | 3051116 | 8/2016 |
| GB | 751400 | 6/1956 |
| JP | H0219649 | 1/1990 |
| JP | H0450464 | 2/1992 |
| JP | H10299605 | 11/1998 |
| JP | H10318098 | 12/1998 |
| JP | H112168 | 1/1999 |
| JP | 2006291910 | 10/2006 |
| JP | 2015068176 | 4/2015 |
| JP | 2015098831 | 5/2015 |
| WO | 2003033907 | 4/2003 |
| WO | 2005061878 | 7/2005 |
| WO | 2011001977 | 1/2011 |
| WO | 2015008638 | 1/2015 |

* cited by examiner

FIG. 26
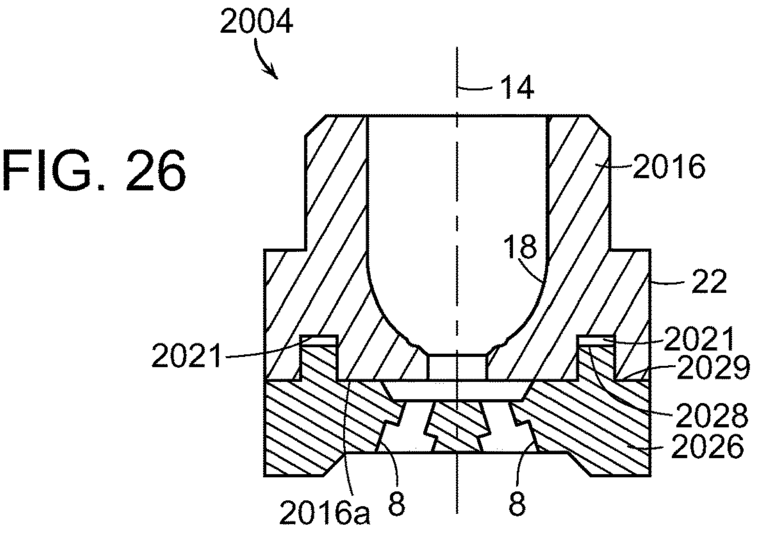
FIG. 27
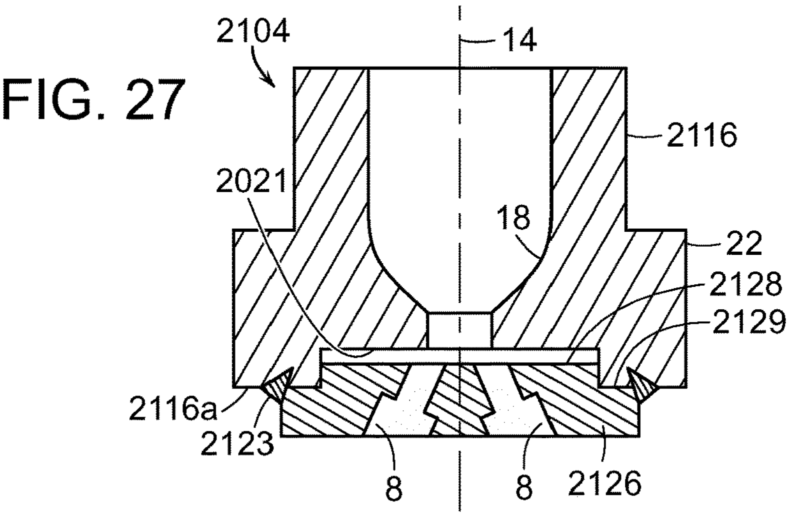
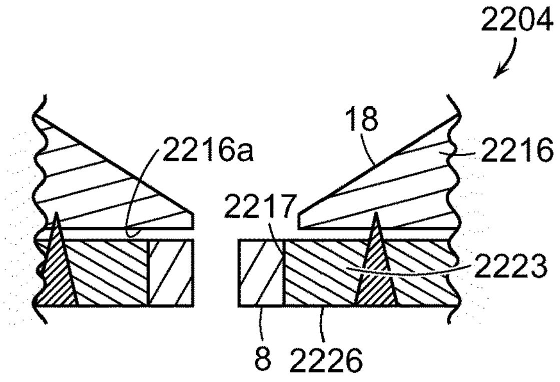
FIG. 28

FUEL INJECTOR VALVE SEAT ASSEMBLY INCLUDING INSERT LOCATING AND RETENTION FEATURES

This application is a 35 U.S.C. § 371 National Stage Application of PCT/EP2019/060352, filed on Apr. 23, 2019, which claims the benefit of priority to U.S. provisional application Ser. No. 62/662,330, filed on Apr. 25, 2018, the disclosures of which are incorporated herein by reference in their entirety.

BACKGROUND

Many internal combustion engines are supplied with fuel using fuel injection systems that include one or more fuel injectors that are configured to spray fuel directly or indirectly into a combustion chamber of an internal combustion engine. Direct fuel injectors operate at high pressures (e.g., pressures of 100 bar or more) and provide fuel directly into the combustion chamber, whereas indirect fuel injectors (port fuel injectors) operate at relatively low pressures (e.g. pressures of 10 bar or less) and provide fuel to a manifold that is upstream of the combustion chamber.

Fuel injectors are required to spray fuel having predetermined spray characteristics, and the spray characteristics required for an engine varies depending on engine conditions. The spray pattern and characteristics of a fuel injector nozzle are determined by shape of the valve seat and the spray holes formed in the valve seat. The characteristics of the spray can contribute greatly to engine-out emissions. For example, controlling certain characteristics can minimize the particulate and gaseous emissions generated by the internal combustion engine that is supplied by the fuel injector. Some of the characteristics that can be controlled include the flow of the fuel within the spray hole of the valve seat, the breakup/atomization of the spray as it exits the spray hole, the penetration of the spray in the combustion chamber and tip wetting of the valve seat.

In some conventional high pressure fuel injectors, spray holes may be formed at the outlet end of the injector by laser drilling. Although an exact positioning and presentation of the spray holes is possible with a laser drilling process, this method also has drawbacks. For example, in some cases the spray hole may be limited to a cylindrical shape. In addition, small inaccuracies while producing the spray holes can lead to variances of the optimum spray figures for the fuel prime mover. Consequences of the small inaccuracies include increased pollutant production for example in the form of an increased particle production, and a lowering of the efficiency in the fuel prime mover due to worsened combustion.

There continues to be a need for fuel injectors having spray holes that are accurately and reliably shaped and positioned, as well as for the manufacturing methods for producing these fuel injectors.

SUMMARY

In some aspects, a high pressure fuel injector includes a spray valve having a valve seat and a valve body that moves relative to the valve seat to open and close spray holes provided at an end of the fuel injector. The valve seat includes a base portion, and an insert that includes the spray holes and that is secured to the base portion. In some embodiments, the insert is manufactured with an electroforming process. The advantage of this method is creation of spray holes within the insert that have shapes, surface features and/or tolerances that cannot be manufactured using some conventional methods such as drilling. The valve seat including the insert having the spray holes provides improved fuel spray quality (for example, better atomization, spray patterns, etc.) relative to some high pressure fuel injectors including spray holes formed by conventional manufacturing methods such as drilling.

Various methods can be used to incorporate or attach the spray holes onto the valve seat, which are shown in the concept sketches. Some embodiments show a separate component, or insert, that is electroformed and attached to a valve seat component to produce the completed valve seat. Other embodiments show a valve seat component, or base, that is incorporated into the electro-forming process, which creates integral spray holes directly onto surfaces of the valve seat. Other embodiments show the valve ball sealing seat incorporated into the insert, rather than the base. Still other embodiments include use of alternative materials and manufacturing processes for producing the base and insert.

In some aspects, a fuel injector includes a fuel injector housing and a valve seat disposed in the fuel injector housing. The valve seat includes a base that is mechanically connected to an end of the fuel injector housing and includes an inner surface, and an insert that cooperates with the base to define a spray hole that extends between the inner surface and an exterior of the valve seat. The fuel injector includes a valve body disposed in the fuel injector housing and operable to move along a longitudinal axis of the fuel injector housing between a first position in which the valve body abuts the inner surface and in which fluid is prevented from passing through the spray hole, and a second position in which the valve body is spaced apart from the inner surface and in which fluid is permitted to pass through the spray hole. A surface of the insert includes surface features that engage with corresponding surface features formed on a surface of the base so as to retain the insert in a predetermined rotational orientation about the longitudinal axis relative to the base.

In some embodiments, the insert has a polygonal peripheral shape when viewed in a cross section that is transverse to the longitudinal axis, a corner of the polygonal peripheral shape of the insert corresponding to one of the surface features of the insert. In addition, the insert is disposed in a vacancy of the base that has a corresponding peripheral shape, a corner of the polygonal peripheral shape of the vacancy corresponding to one of the surface features of the base.

In some embodiments, the surface features of the insert include a recess and the surface features of the base include a protrusion that is disposed in the recess, or the surface features of the insert include a protrusion and the surface features of the base include a recess in which the protrusion is disposed.

In some embodiments, the insert has an irregular peripheral shape when viewed in a cross section that is transverse to the longitudinal axis, the irregular peripheral shape of the insert corresponding to one of the surface features of the insert, and the insert is disposed in a vacancy of the base that has a corresponding irregular peripheral shape, the irregular peripheral shape of the vacancy corresponding to one of the surface features of the base.

In some embodiments, a surface of the insert includes surface features that engage with corresponding surface features formed on a surface of the base so as to retain the insert in an assembled configuration with and in direct contact with the base.

In some embodiments, the surface features of the insert are configured to interlock with the surface features of the base.

In some embodiments, the surface features of the insert include one of a recess and a protrusion, and the surface features of the base includes the other of the recess and the protrusion, where the recess and protrusion are engaged via a press fit.

In some embodiments, the recess and the protrusion include angled surfaces.

In some embodiments, the insert is received within a vacancy that is formed in the base, and wherein the surface features of the base are provided along a surface of the vacancy.

In some embodiments, the insert is received within a vacancy that is formed in the base, and wherein a dimension of the vacancy and the insert at an inner surface of the valve seat is greater than a dimension of the vacancy and the insert at an outer surface of the valve seat.

In some embodiments, the insert is received within a vacancy that is formed in the base, and wherein the insert includes a clip portion that engages an outer surface of the valve seat.

In some embodiments, the insert directly physically contacts the base along an interface, a surface of the insert corresponding to the interface includes insert surface features, and the insert surface features engage with the base so as to retain the insert in an assembled configuration with, and in direct contact with, the base.

In some embodiments, the surface of the base corresponding to the interface includes base surface features, and the insert surface features engage with the base surface features so as to retain the insert in an assembled configuration with, and in direct contact with, the base.

In some embodiments, the valve seat is formed of a first material, and an insert in the form of a coating is provided on a surface of the spray holes, and the coating is a second material that is different from the first material. In some embodiments, the application of the coating is controlled so that the spray hole include surface features that control the spray characteristics of the fuel being injected.

In other embodiments, the insert is formed separately from the base and is attached to the base in subsequent manufacturing steps. In order to retain the insert in the assembled configuration with the valve seat base despite the high pressures generated within the high pressure fuel injector, various structures and methods can be used to incorporate or attach the insert to the base, as discussed in detail below.

In some embodiments, the insert includes insert surface features that engage with corresponding base surface features so as to retain the insert in an assembled configuration with and in direct contact with the base despite the high pressure of the fuel within the fuel injector.

In some embodiments, the insert includes insert surface features that engage with corresponding base surface features so as to retain the insert in a predetermined rotational orientation about the longitudinal axis relative to the base. This feature ensures that the spray holes are properly oriented within the fuel injector.

In some embodiments, the insert is received within a vacancy formed in the base, and the interface between the insert and base is shaped to provide a fluid seal at the interface. This prevents fuel from passing between the insert and the base despite the high pressure of the fuel within the fuel injector.

In some embodiments, the valve body, which is movable within the fuel injector to open and close the spray holes, contacts and forms a seal with the valve seat along an annular seal line, and wherein the seal line is disposed on the insert. This can be compared to some conventional fuel injector configurations, in which the seal line is formed within the base.

In some embodiments, the insert includes a valve body-facing surface and an outward-facing surface that is opposed to the valve body-facing surface. The spray hole extends between the valve body-facing surface and the outward-facing surface. The valve body-facing surface includes a concave portion, and the concave portion is configured so that when the valve body is in the first position a vacant space exists between the concave portion and the valve body.

By providing a valve seat having an insert that provides a spray hole shape that controls the spray pattern and characteristics of a fuel injector nozzle, the characteristics of the spray can be controlled and thus the engine-out emissions may be reduced.

BRIEF DESCRIPTION OF FIGURES

In FIG. 1, the valve body is shown in a first or abutting position relative to the valve seat.

In FIG. 2, the valve body is shown in broken lines illustrating a second or retracted position relative to the valve seat.

FIG. 26 is a cross-sectional view of another alternative embodiment valve seat.

FIG. 27 is a cross-sectional view of another alternative embodiment valve seat.

FIG. 28 is a cross-sectional view of another alternative embodiment valve seat.

In FIG. 29, the valve body is shown in broken lines in a first or abutting position relative to the valve seat.

In FIG. 30, the valve body is shown in broken lines in a first or abutting position relative to the valve seat.

In FIG. 31, the valve body is shown in broken lines in a first or abutting position relative to the valve seat.

In FIG. 32, the valve body is shown in broken lines in a first or abutting position relative to the valve seat.

In FIG. 34, the valve body is shown in broken lines in a first or abutting position relative to the valve seat.

In FIG. 35, the valve body is shown in broken lines in a first or abutting position relative to the valve seat.

DETAILED DESCRIPTION

Figure 1:
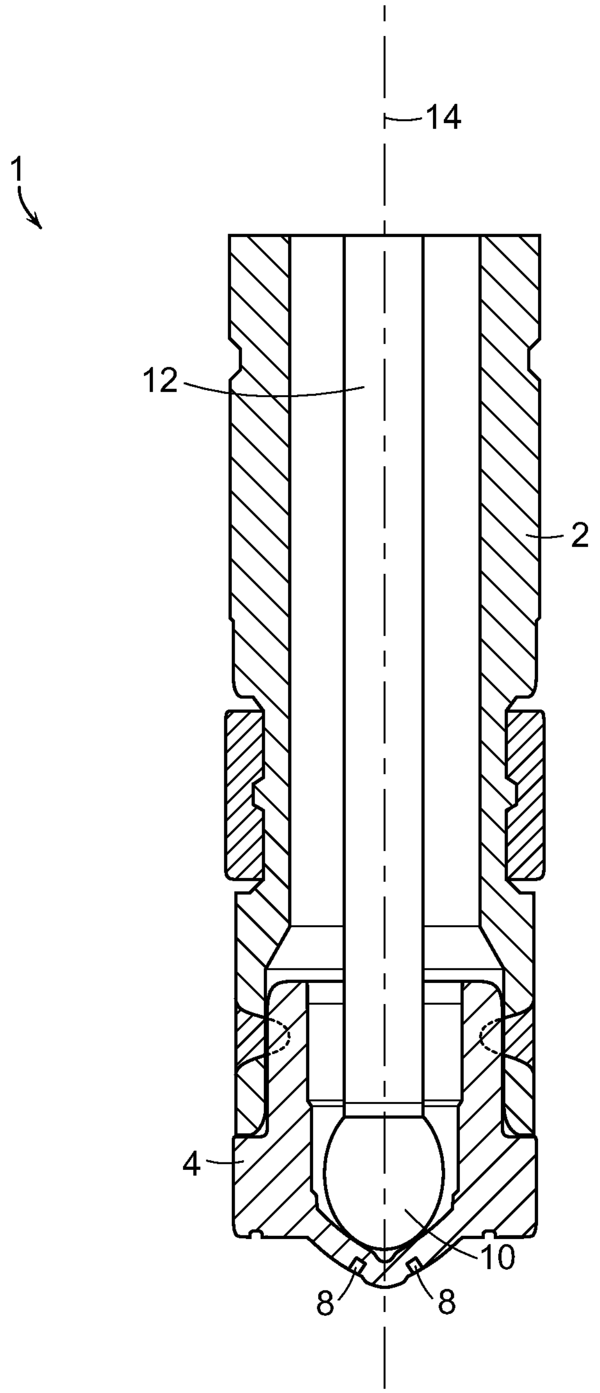
FIG. 1 is a cross-sectional view of a fuel injector including a valve seat.
Figure 2:
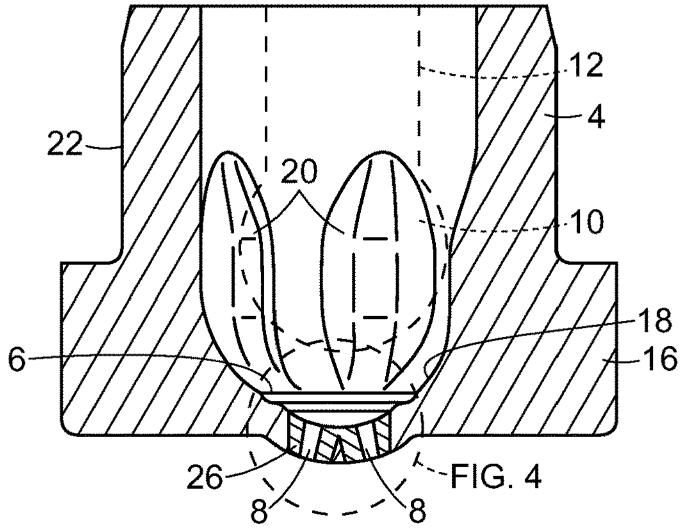
FIG. 2 is a cross-sectional view of the valve seat of FIG. 1, the valve seat including a base and an insert having spray holes disposed in the base.

Referring to FIGS. 1-2, a high pressure fuel injector 1 is used for the injection of fuel such as gasoline into the combustion chamber of an internal combustion engine (not shown) under high pressure, for example under pressures of 100 bar or more. The fuel injector 1 has an elongate tubular housing 2 in the form of a sleeve that supports a spray valve 3 at one end thereof. The spray valve 3 includes a valve seat 4 and a valve body 10 that moves relative to the valve seat 4. The valve seat 4 includes at least one spray hole 8 that serves as a nozzle of the fuel injector 1. The valve body 10 has, for example, the shape of a ball. The valve body 10 is operable by a valve needle 12 to move along the longitudinal axis 14 of the housing 2 between a first position abutting the valve seat 4 (FIG. 1) in which the spray hole 20 is closed, and a second position spaced apart from the valve seat 4 (FIG. 2, see broken lines) in which the spray hole 20 is open. In the illustrated embodiment, the fuel injector 1 is an inward opening fuel injector 1.

The valve seat 4 includes a base 16 and insert 26 that is fixed to the base 16. The base 16 is mechanically connected to an end of the fuel injector housing 2 for example by welding. The concave inner surface 18 of the base 16 includes circumferentially spaced, longitudinally extending ribs 20 that guide the valve body 10 within the base 16. When the valve body 10 is in the first position, it directly contacts and forms a seal with the inner surface 18 along an annular seal line 6. The insert 26 cooperates with the base 16 to define a portion of the inner surface 18, and includes the spray holes 8 that extend between the inner surface 18 and an exterior surface 22 of the valve seat 4. The base 16 and the insert 26 cooperate to provide the valve seat 4, which in turn provides a sealing surface for the valve body 10, guidance for the valve needle 12, the spray holes 8 that atomize fuel, and flow paths for directing fuel to the spray holes 8. In addition, the valve seat 4 acts as the barrier between the engine combustion chamber and the inside of the injector housing 2.

Figure 3:
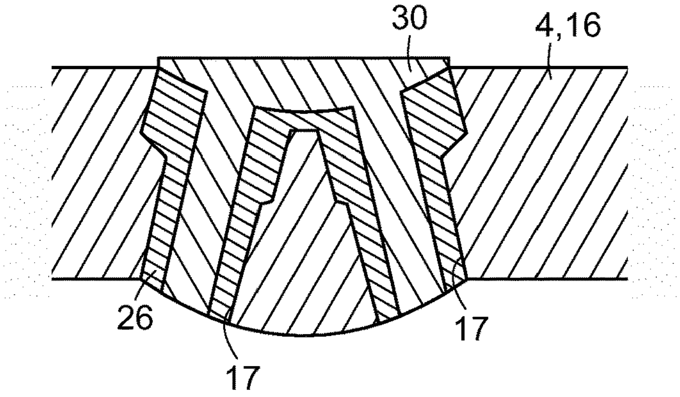
FIG. 3 is an enlarged view of the portion of the valve seat identified with dot-dashed lines in FIG. 2 illustrating the insert with a substrate disposed in base openings.
Figure 4:
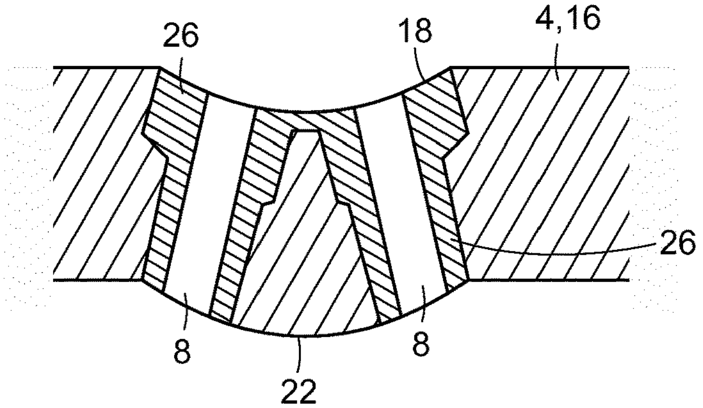
FIG. 4 is an enlarged view of the portion of the valve seat identified with dot-dashed lines in FIG. 2 illustrating the insert after the substrate has been removed.

Referring to FIGS. 3 and 4, the base portion 16 of the valve seat 4 may be manufactured as a single component, for example, by a metal injection molding (MIM) process, and is welded to the injector housing 2 during assembly. During the molding process, openings 17 for the spray holes 8 are provided in the base portion 16 that are enlarged relative to the required dimensions of the finished spray holes 8. Subsequent to forming the base portion 16, the insert 26 including the spray holes 8 is constructed on the base portion 16 using an electroplating process, described below. The insert 26 that is constructed by the electroplating process is securely fixed to the base portion 16. In addition, the spray holes 8 that are formed in the insert 26 are accurately positioned and can have an accurately formed and complicated geometry that provides an optimum injection of fuel and therefore an optimum combustion in the combustion chamber of an engine. The electroplating process advantageously provides a simple and efficient way to join the insert 26 to the base 16, while achieving a valve seat 4 that is formed with high accuracy and without costly and/or lavish postprocessing.

The electroplating process may include providing the valve seat base 16 including the openings 17 that are oversized relative to the relative to the required dimensions of the finished spray holes 8. A substrate 30 is provided that has an external shape that includes generally rod-shaped elements 32, each element 32 defining an individual spray hole 8 and each element 32 having an outer surface that is shaped and dimensioned to corresponding to the shape and dimension of the inner surface of the respective spray hole 8. In some embodiments, the substrate 30 may be constructed using a 3D printing process. The substrate 30 is assembled with the base 16 with an element 32 disposed in each opening 17. The substrate 30 is dimensioned having a clearance fit relative to the base 16 such that each element 32 is smaller than the openings 17, whereby a gap exists between the openings 17 and the substrate 30. The insert 26 is then formed on the base 16 by application of an electroplated layer (e.g., a galvanization layer) between the substrate 30 and the base 16. This is achieved by placing the valve seat 4 including the substrate 8 assembled therewith in an electroplating bath of an appropriate electrolyte solution. A metal anode formed of the plating material is also placed in the bath, and an electrical current is passed through the valve seat 4 (as the cathode) as well as the anode. As a result, a thin galvanization layer forms along the surfaces of the valve seat base 16 and including the surfaces within the gap, and eventually, the gap is filled by the galvanized material. The substrate 30 can be appropriately configured so that an exact positioning and styling of the spray holes 8 can be realized in the insert 26 that is generated directly on the base 16.

Using electroplating to generate an insert 26 on the surface of the base 16 is a very adaptable process that allows formation of detailed parts. It can be performed as a batch process (e.g., several valve seats 4 can be electroplated simultaneously) and thus efficient and reliable production of injectors 1 is possible. Moreover, variations in the geometry of the insert 26 including positioning of the spray holes 8, as well as the geometry of the individual spray holes 8 including overall shape and/or fluid directing surface features, can be carried out easily by variation of the negative form (e.g., the sacrificial substrate 30), while otherwise maintaining the production procedures.

Following formation of the insert 26, the substrate is removed (FIG. 4). Depending upon the geometry of the insert, it may be possible to simply withdraw the substrate 30 from the valve seat 4. In other embodiments, the substrate 30 may be sacrificed. For example, the substrate 30 may be made of plastic, and the substrate 30 may be sacrificed by heating the valve seat 4 sufficiently to melt or burn out the substrate from valve seat 4, leaving the insert 26 in an assembled configuration with the base 16.

In some embodiments, prior to electroplating, selected strategic portions of the base 16 may be provided with a coating of an electrically conductive material. This can be achieved, for example, using a silver varnish or a graphite spray. The strategic portions may correspond, for example, to surfaces upon which the insert 26 is to be formed. In addition, the substrate 30 can completely or partially coated in a similar fashion. The galvanization layer forms in each case in the portions of the base 16 and substrate 30 whose surface is coated with the electrically conductive material. Thereby it is simply possible, for example, with a substrate 30 formed of an insulating material to establish the insert 26 including the spray holes 8. In other embodiments, the substrate 30 may be formed of an electrically conductive material.

In some embodiments, the insert 26 formed by the electroplating process is formed of nickel. Nickle is advantageously adaptable and is compatible with a large number of materials of the injector-basic body. In addition, nickel offers a good corrosion protection.

In the embodiment illustrated in FIG. 4, a single insert 26 that includes multiple spray holes 8 is constructed on the surface of the base 16. However, the valve seat 4 is not limited to this configuration, and in some embodiments, the valve seat 4 may include multiple inserts 26. For example, the valve seat 4 may include an individual insert for each opening 17 formed in the base 16.

Figure 5:
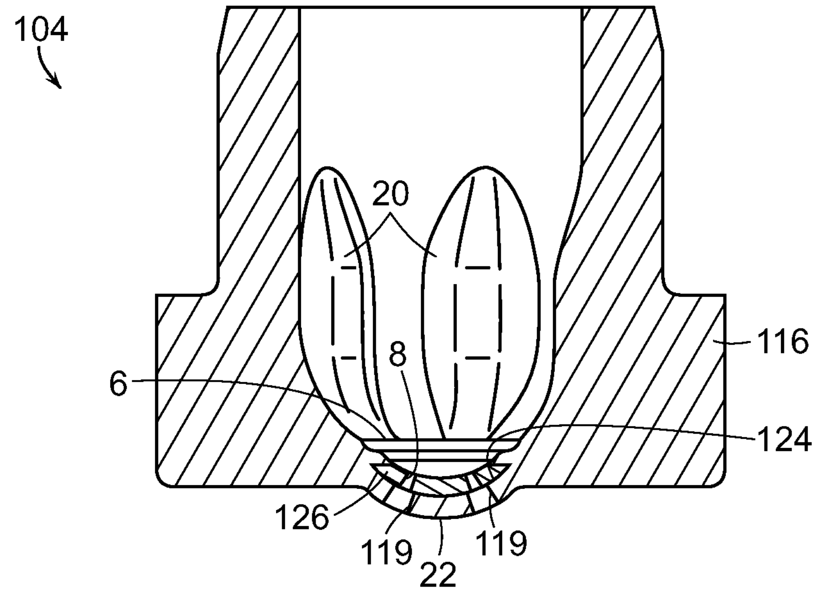
FIG. 5 is a cross-sectional view of an alternative embodiment valve seat.

Referring to FIG. 5, an alternative embodiment valve seat 104 is similar to the valve seat 4 illustrated in FIGS. 1-4 in that it includes an insert 126 that is incorporated into the base 116 via an electroforming process such that the spray holes 8 are formed by depositing metal directly onto the surfaces of the base 116. In this embodiment and the following embodiments, common elements are referred to using common reference numbers. The valve seat 104 of FIG. 5 differs from the previous embodiment in that the insert 126 provides a larger portion of the valve seat inner surface 18. In particular, the insert 126 provides a portion of the inner surface 18 that resides below the seal line 6.

In addition, the insert 126 does not extend to the valve seat outer surface 22, and instead is formed in a vacancy 124 formed in the inner surface. The periphery of the vacancy 124 is inset into the base 116, which further ensures that the insert 126 is retained within the vacancy regardless of fluid pressures within the fuel injector 1. The base 116 includes pre-holes 119 that extend between the vacancy 124 and the outer surface 22, and are aligned with spray holes 8 formed in the insert 126.

Figure 6:
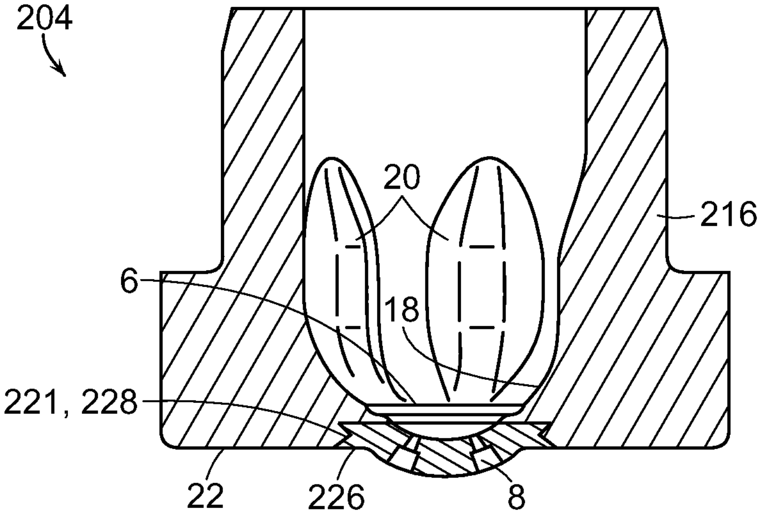
FIG. 6 is a cross-sectional view of another alternative embodiment valve seat.

Referring to FIG. 6, another alternative embodiment valve seat 204 is similar to the valve seat 104 illustrated in FIG. 5 in that it includes an insert 226 that is incorporated into the base 216 via an electroforming process such that the spray holes 8 are formed by depositing metal directly onto the surfaces of the base 216. Like the valve seat of FIG. 5, the insert 226 provides a portion of the inner surface 18 that is disposed below the seal line 6. The valve seat 204 of FIG. 6 differs from the valve seat 104 of FIG. 5 in that the insert 226, including the spray holes 8, extends longitudinally between the inner surface 18 and the outer surface 22. In addition, the periphery of the insert 226 include surface features 228 (i.e., an angled recess) that are shaped to interlock with, and engage, complementary surface features 221 (i.e., an angled protrusion) formed on the base 216. The cooperative engagement provided by the interlocked surface features 221, 228 further ensures that the insert 226 is retained in an assembled configuration with the base 216 regardless of fluid pressures within the fuel injector 1.

Figure 7:
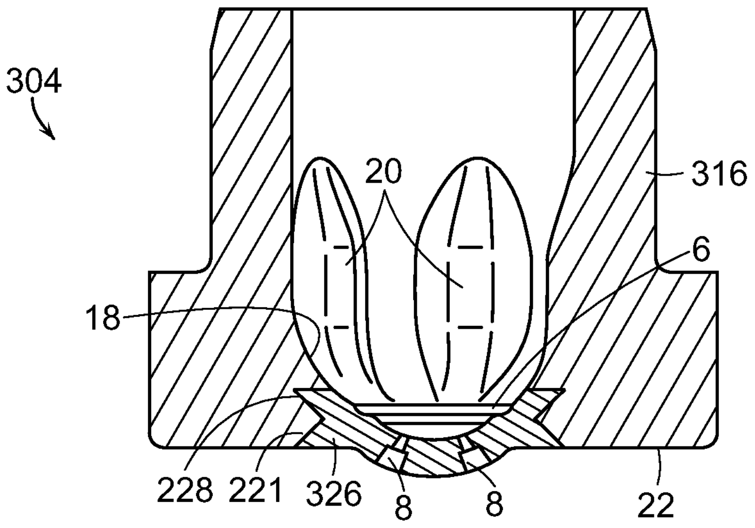
FIG. 7 is a cross-sectional view of another alternative embodiment valve seat.

Referring to FIG. 7, another alternative embodiment valve seat 304 is similar to the valve seat 204 illustrated in FIG. 6 in that it includes an insert 326 that is incorporated into the base 316 via an electroforming process such that the spray holes 8 are formed by depositing metal directly onto the surfaces of the base 316. Like the insert 226 of FIG. 6, the insert 326 of FIG. 7 provides a portion of the inner surface 18, and extends longitudinally between the inner surface 18 and the outer surface 22. In addition, the periphery of the insert 326 include surface features 228 (i.e., an angled recess) that are shaped to interlock with, and engage, complementary surface features 221 (i.e., an angled protrusion) formed on the base 316. The cooperative engagement provided by the interlocked surface features 221, 228 further ensures that the insert 326 is retained in an assembled configuration with the base 316 regardless of fluid pressures within the fuel injector 1. The insert 326 of FIG. 7 differs from the insert 226 of FIG. 6 in that it is shaped and dimensioned to include the seal line 6.

Like the insert 226 of FIG. 6, the insert 326 of FIG. 7 provides a portion of the inner surface 18, and extends longitudinally between the inner surface 18 and the outer surface 22. In addition, the periphery of the insert 326 include surface features 228 (i.e., an angled recess) that are shaped to interlock with, and engage, complementary surface features 221 (i.e., an angled protrusion) formed on the base 316. The cooperative engagement provided by the interlocked surface features 221, 228 further ensures that the insert 326 is retained in an assembled configuration with the base 316 regardless of fluid pressures within the fuel injector 1. The insert 326 of FIG. 7 differs from the insert 226 of FIG. 6 in that it is shaped and dimensioned to include the seal line 6.

Figure 8:
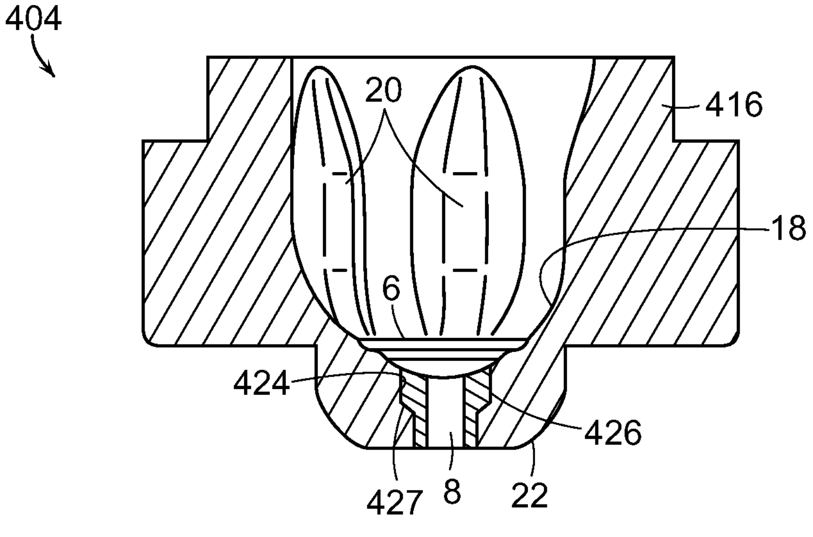
FIG. 8 is a cross-sectional view of another alternative embodiment valve seat.

Referring to FIG. 8, another alternative embodiment valve seat 404 differs from the previously described embodiments in that it includes an insert 426 that is formed separately from the base 416, and then is assembled with the base 416 to form the valve seat 404. The insert 426 includes one or more spray holes 8 and may be formed of nickel in an electroforming process, but the insert 426 is not limited to this material or to being formed by an electroforming process. The insert 426 is incorporated into the base 416 and retained thereon via an interference fit (e.g., press fit or shrink fit), welding or staking. In addition, the outer surface 427 of the insert 426 has a stepped (illustrated) or tapered (not shown) outer shape that is complementary to and cooperates with the shaped vacancy 424 in the base 416 in order to provide mechanical retention of the insert 426 within the vacancy 424. In the embodiment illustrated in FIG. 8, the insert 426 is a small insert (i.e., only large enough to provide a single spray hole 8) that does not include the seal line 6. In addition, the step or taper of the outer surface 427 of the insert 426 is configured to require that the insert 426 be assembled from inside the valve seat 404. For example, in the illustrated embodiment, portions of the insert 426 closer to the inner surface 18 are larger in diameter than portions of the insert 426 closer to the outer surface 22.

Figure 9:
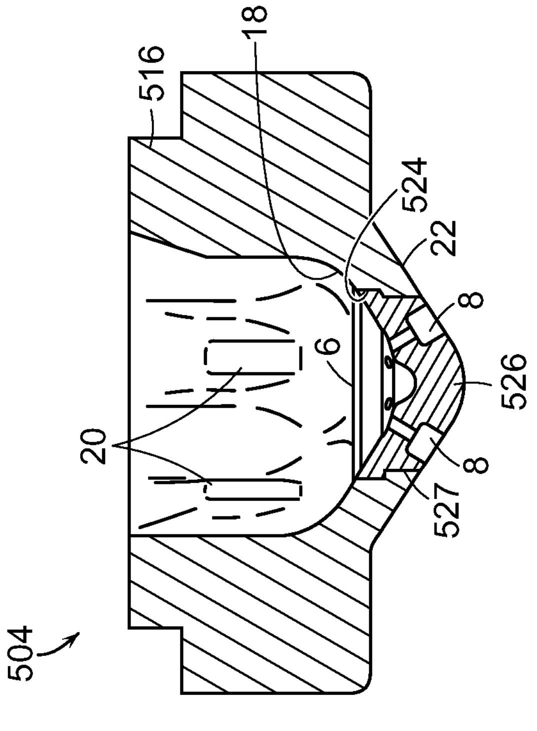
FIG. 9 is a cross-sectional view of another alternative embodiment valve seat.

Referring to FIG. 9, another alternative embodiment valve seat 504 is similar to the valve seat 404 illustrated in FIG. 8 in that it includes an insert 526 that is formed separately from the base 516, and then is assembled with the base 516 to form the valve seat 504. The insert 526 includes one or more spray holes 8 and may be formed of nickel in an electroforming process, but the insert 526 is not limited to this material or to being formed by an electroforming process. The insert 526 is incorporated into the base 516 and retained thereon via an interference fit (e.g., press fit or shrink fit), welding or staking. In addition, the insert 526 has a stepped (illustrated) or tapered outer shape that is complementary to and cooperates with the shaped vacancy 524 in the base 516 in order to provide mechanical retention of the insert 526 within the vacancy 524. In the embodiment illustrated in FIG. 9, the insert 526 is sufficiently large provide multiple spray holes 8 and to include the seal line 6. In addition, the step or taper of the outer surface of the insert 526 is configured to require that the insert 526 be assembled from inside the valve seat 504. That is, portions of the insert 526 closer to the inner surface 18 are larger in diameter than portions of the insert 526 closer to the outer surface 22.

Figure 10:
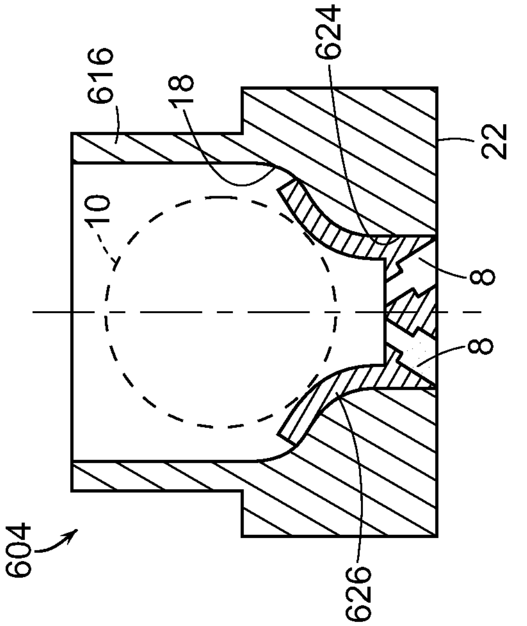
FIG. 10 is a cross-sectional view of another alternative embodiment valve seat.

Referring to FIG. 10, another alternative embodiment valve seat 604 is similar to the valve seat 404 illustrated in FIG. 8 in that it includes an insert 626 that is formed separately from the base 616, and then is assembled with the base 616 to form the valve seat 604. The insert 626 includes one or more spray holes 8 and may be formed of nickel in an electroforming process, but the insert 626 is not limited to this material or to being formed by an electroforming process. The insert 626 is incorporated into the base 616 and retained thereon via an interference fit (e.g., press fit or shrink fit), welding or staking. In addition, the insert 626 has a stepped (illustrated) or tapered outer shape that is complementary to and cooperates with both a portion of the valve seat inner surface 18 and a vacancy 624 in the base 616 in order to provide mechanical retention of the insert 626 within the vacancy 624. In the embodiment illustrated in FIG. 10, the insert 626 is sufficiently large provide multiple spray holes 8 and to include the seal line 6. In addition, the shape of the outer surface of the insert 626 is configured to require that the insert 626 be assembled from inside the valve seat 604. That is, portions of the insert 626 that contact the inner surface 18 are larger in diameter than portions of the insert 526 disposed within the vacancy 624.

Figure 11:
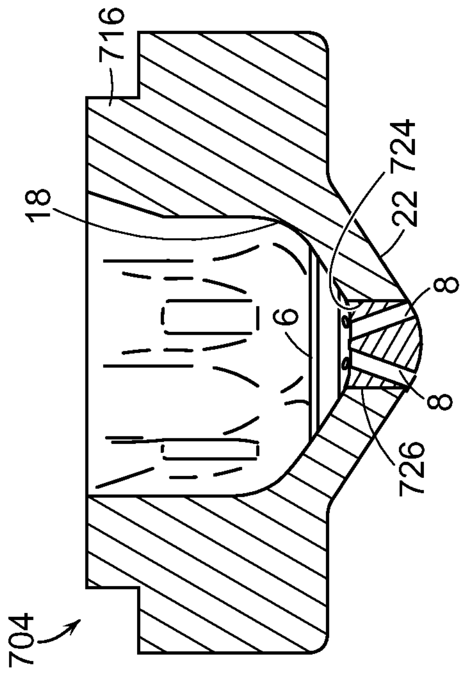
FIG. 11 is a cross-sectional view of another alternative embodiment valve seat.

Referring to FIG. 11, another alternative embodiment valve seat 704 is similar to the valve seat 404 illustrated in FIG. 8 in that it includes an insert 726 that is formed separately from the base 716, and then is assembled with the base 716 to form the valve seat 704. The insert 726 includes one or more spray holes 8 and may be formed of nickel in an electroforming process, but the insert 726 is not limited to this material or to being formed by an electroforming process. Unlike the insert 426 of FIG. 8, the insert 726 of FIG. 11 has an outer shape that is of uniform diameter whereby the outer surface of the insert 726 is free of steps or tapers. The insert 726 is disposed in a vacancy 724 in the base 716 that has a complimentary inner shape and dimensions. The insert 726 is incorporated into the base 716 and retained thereon via an interference fit (e.g., press fit or shrink fit), welding or staking. In the embodiment illustrated in FIG. 11, the insert 726 is sufficiently large to provide multiple spray holes 8 but resides below, and does not include, the seal line 6. The insert 726 can be assembled with the base 716 from inside or outside the valve seat 704.

Figure 12:
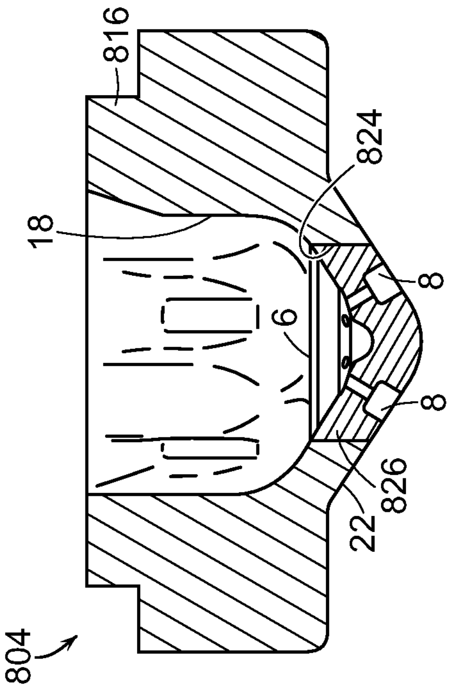
FIG. 12 is a cross-sectional view of another alternative embodiment valve seat.

Referring to FIG. 12, another alternative embodiment valve seat 804 is similar to the valve seat 704 illustrated in FIG. 11 in that it includes an insert 826 that is formed separately from the base 816, and then is assembled with the base 816 to form the valve seat 804. The insert 826 includes one or more spray holes 8 and may be formed of nickel in an electroforming process, but the insert 826 is not limited to this material or to being formed by an electroforming process. Like the insert 726 of FIG. 11, the insert 826 of FIG. 12 has an outer shape that is of uniform diameter whereby the outer surface of the insert 826 is free of steps or tapers. The insert 826 is disposed in a vacancy 824 in the base 816 that has a complimentary inner shape and dimensions. The insert 826 is incorporated into the base 816 and retained thereon via an interference fit (e.g., press fit or shrink fit), welding or staking. In the embodiment illustrated in FIG. 12, the insert 826 is sufficiently large provide multiple spray holes 8 and extends above, and includes, the seal line 6. The insert 826 can be assembled with the base 816 from inside or outside the valve seat 804.

Figure 13:
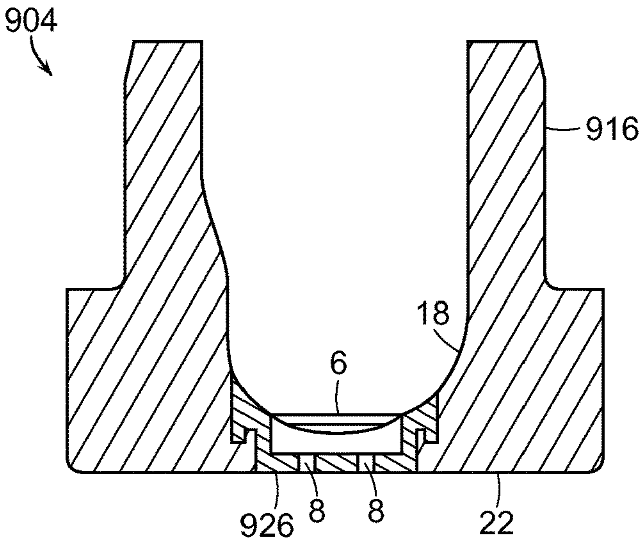
FIG. 13 is a cross-sectional view of another alternative embodiment valve seat.

Referring to FIG. 13, another alternative embodiment valve seat 904 is similar to the valve seat 704 illustrated in FIG. 11 in that it includes an insert 926 that is formed separately from the base 916, and then is assembled with the base 916 to form the valve seat 904. The insert 926 includes one or more spray holes 8 and may be formed of nickel in an electroforming process, but the insert 926 is not limited to this material or to being formed by an electroforming process. The insert 926 of FIG. 13 has cylindrical outer shape that is of non-uniform diameter whereby the outer surface of the insert 926 has a larger diameter at the inner surface 18 than at the outer surface 22, and a shoulder 929 is provided at the transition between the two diameters. The insert shoulder 929 includes a longitudinally extending recess 929*a* that opens facing the outer surface 22. The base 916 has a vacancy 924 that receives the insert 926. The vacancy 924 has a shape and dimensions that are complimentary to those of the insert 926. In particular, the vacancy 924 is of non-uniform diameter whereby the inner surface of the vacancy 924 has a larger diameter at the inner surface 18 than at the outer surface 22, and a base shoulder 925 is provided at the transition between the two diameters. The base shoulder 925 has a protrusion 925*a* that is received within the recess 929*a*. The insert 926 is disposed in the vacancy 924 in the base 816 and is retained thereon via the interlocking engagement between the insert recess 929*a* and the base protrusion 925*a*. The cooperative engagement provided by the interlocked surface features 925, 925*a*, 929, 929*a* ensures that the insert 926 is retained in an assembled configuration with the base 916 regardless of fluid pressures within the fuel injector 1. In the embodiment illustrated in FIG. 13, the insert 926 is sufficiently large provide multiple spray holes 8 and extends above, and includes, the seal line 6. The insert 926 can be assembled with the base 816 from inside the valve seat 904.

Figure 14:
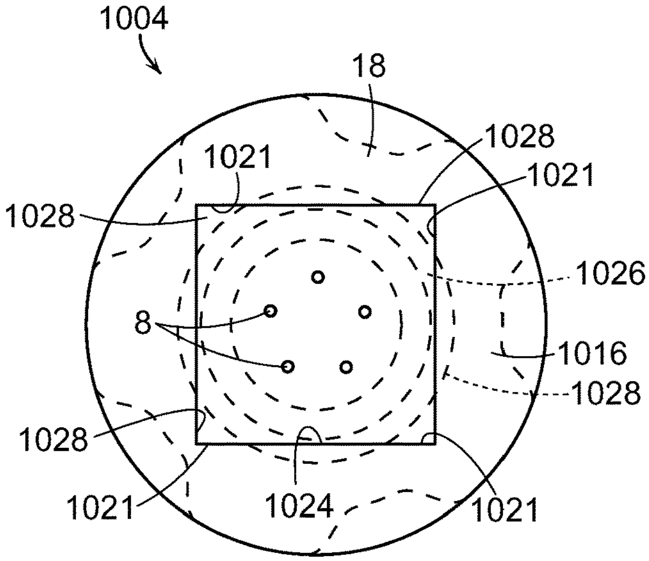
FIG. 14 is top plan view of a portion of another alternative embodiment valve seat.
Figure 15:
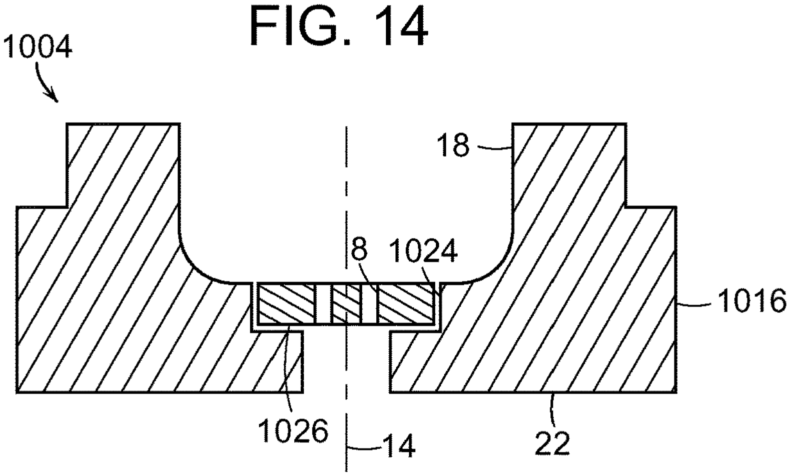
FIG. 15 is a cross-sectional view of the portion of the valve seat of FIG. 14.

Referring to FIGS. 14 and 15, another alternative embodiment valve seat 1004 is similar to the valve seat 404 illustrated in FIG. 8 in that it includes an insert 1026 that is formed separately from the base 1016, and then is assembled with the base 1016 to form the valve seat 1004. The insert 1026 includes one or more spray holes 8 and may be formed of nickel in an electroforming process, but the insert 1026 is not limited to this material or to being formed by an electroforming process. The insert 1026 includes insert surface features 1028 that engage with corresponding base surface features 1021 so as to retain the insert 1026 in a predetermined rotational orientation about the longitudinal axis 14 relative to the base 1016. For example, in the embodiment illustrated in FIGS. 14 and 15, the insert 1026 has a rectangular peripheral shape, and is received within a rectangular vacancy 1024 formed in the base inner surface 18. In this example, the corners of the insert 1026 serve as surface features 1028 that engage with corresponding surface features 1021 corresponding to the corners of the vacancy 1024. The engagement between these surface features 1028, 1021 orients the insert 1026 relative to the base 1016, and prevents relative motion between the insert 1026 and the base 1016 about the longitudinal axis 14. The insert 1026 and base 1016 may include additional features that otherwise retain the insert 1026 in engagement with the base 1016, for example, the features previously discussed with respect to FIGS. 1-13, but not limited thereto.

Figure 16:
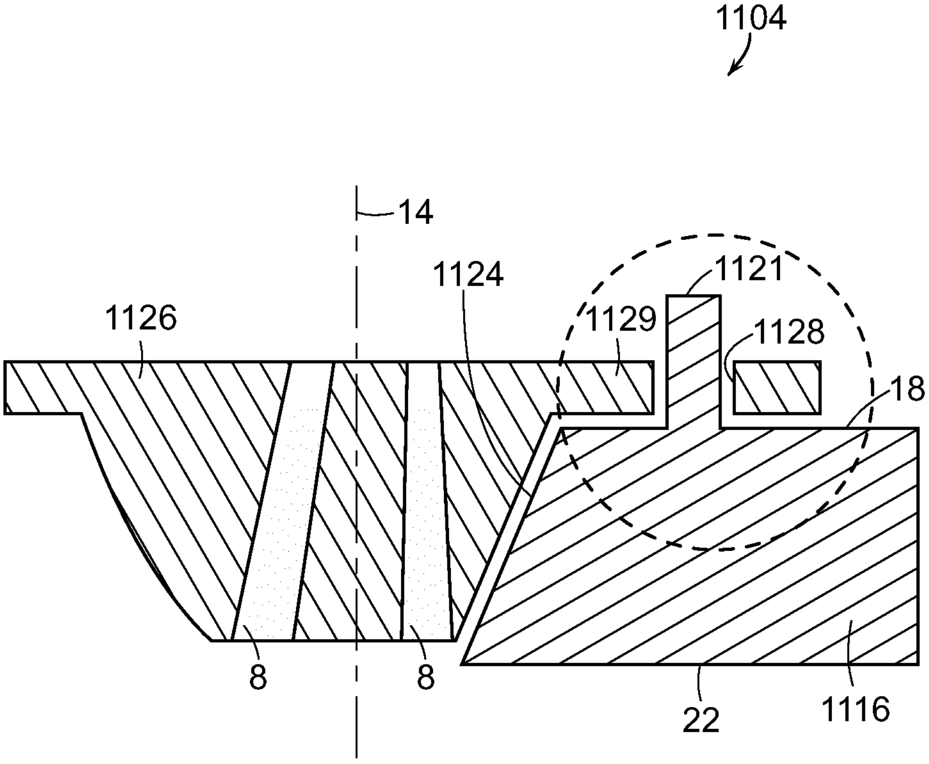
FIG. 16 is a cross-sectional view of a portion of another alternative embodiment valve seat.

Referring to FIG. 16, another alternative embodiment valve seat 1104 is similar to the valve seat 1004 illustrated in FIGS. 14 and 15 in that it includes an insert 1126 that is formed separately from the base 1116, and then is assembled with the base 1116 to form the valve seat 1104. The insert 1126 includes one or more spray holes 8 and may be formed of nickel in an electroforming process, but the insert 1126 is not limited to this material or to being formed by an electroforming process. The insert 1126 includes insert surface features 1128 that engage with corresponding base surface features 1121 so as to retain the insert 1126 in a predetermined rotational orientation about the longitudinal axis 14 relative to the base 1116. For example, in the embodiment illustrated in FIG. 16, the insert 1126 is received within a vacancy 1124 formed in the base 1116, and includes a flange 1129 that overlies a portion of the base inner surface 18. The flange 1129 includes an opening 1128 that corresponds to the insert surface feature. The opening 1128 is configured to receive a post 1121 that protrudes from the inner surface 18 and corresponds to the base surface feature. In this example, the post 1121 engages with opening 1128 whereby the insert 1126 is oriented relative to the base 1116, and is prevented from motion relative motion to the base 1116 about the longitudinal axis 14. The insert 1126 and base 1116 may include additional features that otherwise retain the insert 1026 in engagement with the base 1016, for example, the features previously discussed with respect to FIGS. 1-13, but not limited thereto.

Figure 17:
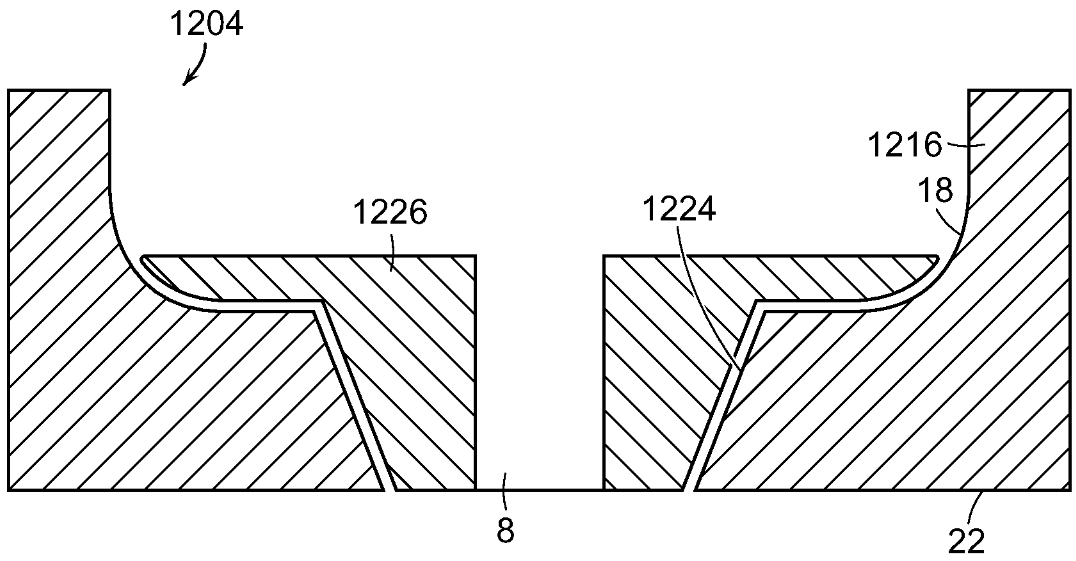
FIG. 17 is a cross-sectional view of a portion of another alternative embodiment valve seat.
Figure 18A:
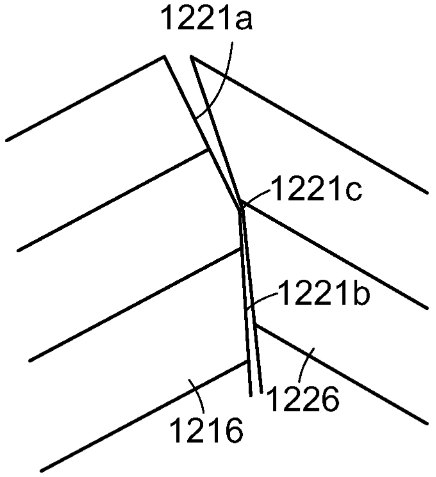
FIG. 18A is an enlarged cross-sectional view of the encircled portion of FIG. 17.
Figure 18B:
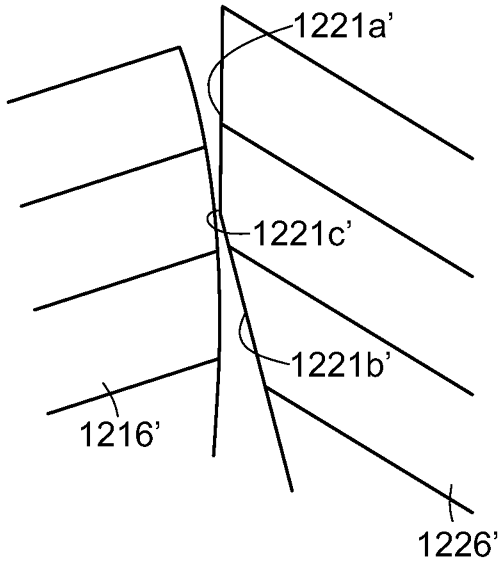
FIG. 18B is an enlarged cross-sectional view of an alternative embodiment of the encircled portion of FIG. 17.

Referring to FIGS. 17 and 18A-18B, another alternative embodiment valve seat 1204 is similar to the valve seat 404 illustrated in FIG. 8 in that it includes an insert 1226 that is formed separately from the base 1216, and then is assembled with the base 1216 to form the valve seat 1204. The insert 1226 includes one or more spray holes 8 and may be formed of nickel in an electroforming process, but the insert 1226 is not limited to this material or to being formed by an electroforming process. The insert 1226 is incorporated into a vacancy 1224 in the base 1216 and retained therein via an interference fit (e.g., press fit or shrink fit), welding or staking. Although only one spray hole 8 is shown, the insert 1226 may include multiple spray holes 8 having any desired geometry. In the illustrated embodiment, the taper of the outer surface of the insert 1226 is configured to require that the insert 1226 be assembled from inside the valve seat 1204. That is, portions of the insert 1226 closer to the inner surface 18 are larger in diameter than portions of the insert 1226 closer to the outer surface 22. However, the insert 1226 is not limited to a shape that requires insertion from the inside of the valve seat 1204. In addition, the interface between the insert 1226 and base 1216 is shaped to provide a fluid seal at the interface. In particular, at the interface, the base 1216 includes a first linear portion 1221*a* and a second linear portion 1221*b* that adjoins the first linear portion 1221*a* at an angle θ. Although the angle θ is illustrated as being obtuse, it is not limited thereto and can be for example, acute. The intersection of the first linear portion 1221 and the second linear portion 1221*b* defines a seal edge 1221*c* that engages with the facing surface of the insert 1226 so as to provide a fluid seal at the interface. That is, when the insert 1226 is press fit ("wedged") into the vacancy 1224, the non-matching taper that is provided at the interface locks the insert 1226 into place and provides a fluid-tight seal along the seal edge 1221*c*. Although FIG. 18A illustrates that the base 1216 includes the adjoining nonlinear portions 1221*a*, 1221*b*, it is understood that these features can alternatively be provided on the insert 1226 rather than the base 1216 (FIG. 18B).

Figure 19:
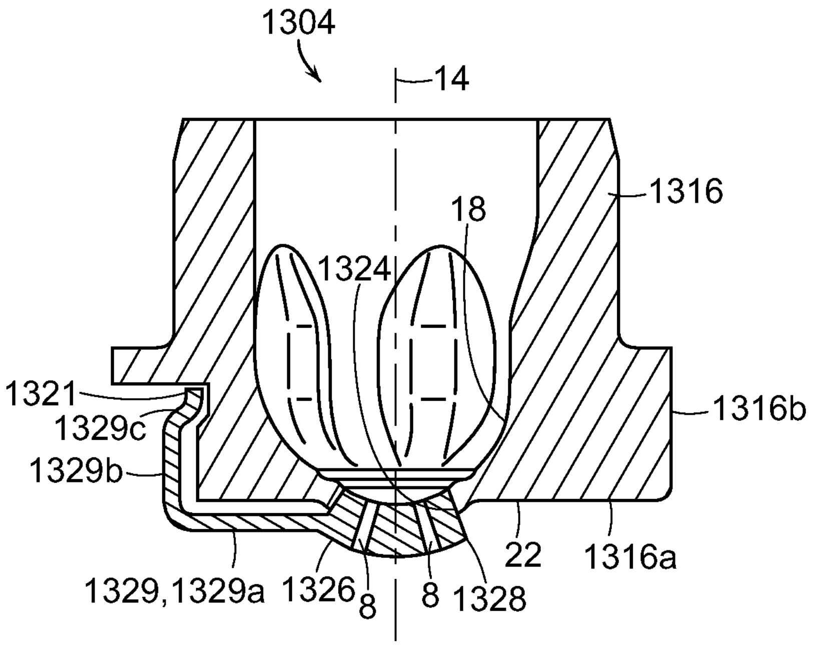
FIG. 19 is a cross-sectional view of another alternative embodiment valve seat.

Referring to FIG. 19, another alternative embodiment valve seat 1304 differs from the previously described embodiments in that it includes an insert 1326 that is formed separately from the base 1316, and then is assembled with the base 1316 to form the valve seat 1304. The insert 1326 includes one or more spray holes 8 and may be formed of nickel in an electroforming process, but the insert 1326 is not limited to this material or to being formed by an electroforming process. The insert 1326 includes a central portion 1328 having spray holes 8 formed therein, and clip portion 1329 that is integral to the central portion 1328 and protrudes outward from the central portion 1328 in a direction perpendicular to the longitudinal axis 14.

When the insert 1326 is assembled with the base 1316, the central portion 1328 is received in a corresponding vacancy 1324 of the base 1316, and the clip portion 1329 abuts the outer surface 22. In some embodiments, the clip portion 1329 may include one or more "fingers" (e.g., narrow extensions) that extend radially outward from the central portion 1328. For example, the clip portion 1329 may include a radially extending portion 1329*a* that overlies the terminal end 1316*a* of the base 1361, and a longitudinally extending portion 1329*b* that overlies a portion of the lateral side 1316*b* of the base 1316. The longitudinally extending portion 1329*b* terminates in an inwardly protruding portion 1329*c* that extends into and engages with a groove 1321 formed in the base lateral side 1316*b*.

In some embodiments, during assembly, the clip portion 1329 may elastically expand to allow the inwardly protruding portion 1329*c* to pass over the base terminal end 1316*a* and engage with the groove 1321. In other embodiments, the longitudinally extending portion 1329*b* may be formed in an outwardly spread configuration, and during assembly, a rolling process is performed to deform the longitudinally extending portion 1329*b* inward against the lateral side 1316*b*. In any case, after assembly, the insert 1316 is retained on the base 1316 via engagement of the inwardly protruding portion 1329*c* with the groove 1321. In the embodiment illustrated in FIG. 19, the insert 1326 does not include the seal line 6. In addition, the insert 1326 is configured to be assembled from outside the base 1316.

Figure 20:
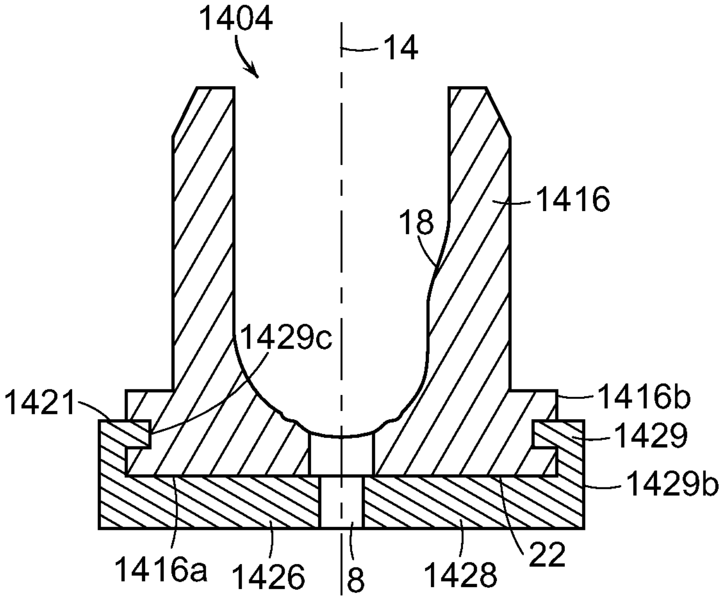
FIG. 20 is a cross-sectional view of another alternative embodiment valve seat.

Referring to FIG. 20, another alternative embodiment valve seat 1404 is similar to the valve seat 1304 illustrated in FIG. 19 in that it includes an insert 1426 that is formed separately from the base 1416, and then is assembled with the base 1416 to form the valve seat 1404. The insert 1426 includes one or more spray holes 8 and may be formed of nickel in an electroforming process, but the insert 1426 is not limited to this material or to being formed by an electroforming process. The insert 1426 includes a plate portion 1428 having spray holes 8 formed therein, and clip portion 1429 that is integral to the plate portion 1428 and protrudes from a periphery of the plate portion 1428 in a direction parallel to the longitudinal axis 14.

When the insert 1426 is assembled with the base 1416, the plate portion 1428 abuts the terminal end 1416*a* of the base 1416, and the clip portion 1429 abuts the lateral side 1416*b* of the base 1416. In some embodiments, the clip portion 1429 may include one or more “fingers” (e.g., narrow extensions) that extend axially from the plate portion 1428. For example, the clip portion 1429 may include a longitudinally extending portion 1429*b* that overlies a portion of the lateral side 1416*b* of the base 1416. The longitudinally extending portion 1429*b* terminates in an inwardly protruding portion 1429*c* that extends into and engages with a groove 1421 formed in the base lateral side 1416*b*. In some embodiments, during assembly, the clip portion 1429 may elastically expand to allow the inwardly protruding portion 1429*c* to pass over the base terminal end 1416*a* and engage with the groove 1421. In other embodiments, the longitudinally extending portion 1429*b* may be formed in an outwardly spread configuration, and during assembly, a rolling process is performed to deform the longitudinally extending portion 1429*b* inward against the lateral side 1416*b*. In any case, after assembly, the insert 1416 is retained on the base 1416 via engagement of the inwardly protruding portion 1429*c* with the groove 1421. In the embodiment illustrated in FIG. 20, the insert 1426 does not include the seal line 6. In addition, the insert 1426 is configured to be assembled from outside the base 1416.

Figure 21:
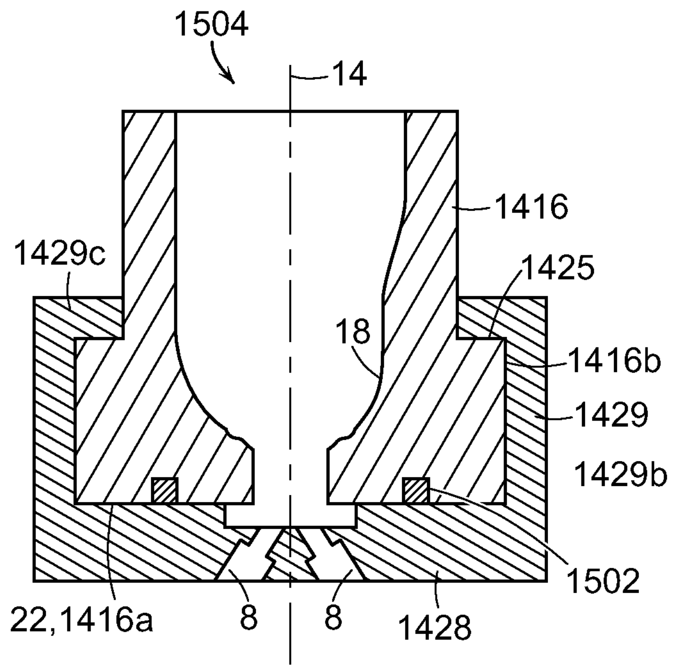
FIG. 21 is a cross-sectional view of another alternative embodiment valve seat.

Referring to FIG. 21, another alternative embodiment valve seat 1504 is similar to the valve seat 1404 illustrated in FIG. 20 except that the base 1416 is formed without the groove 1421, and the longitudinally extending portion 1429*b* is provided in a length that is sufficient to allow the inwardly protruding portion 1429*c* of the clip portion 1429 of the insert 1426 to engage with a shoulder 1425 of the valve seat base 1416. In this embodiment, an annular seal 1502 may optionally be provided between the insert 1416 and the base 1416.

Figure 22:
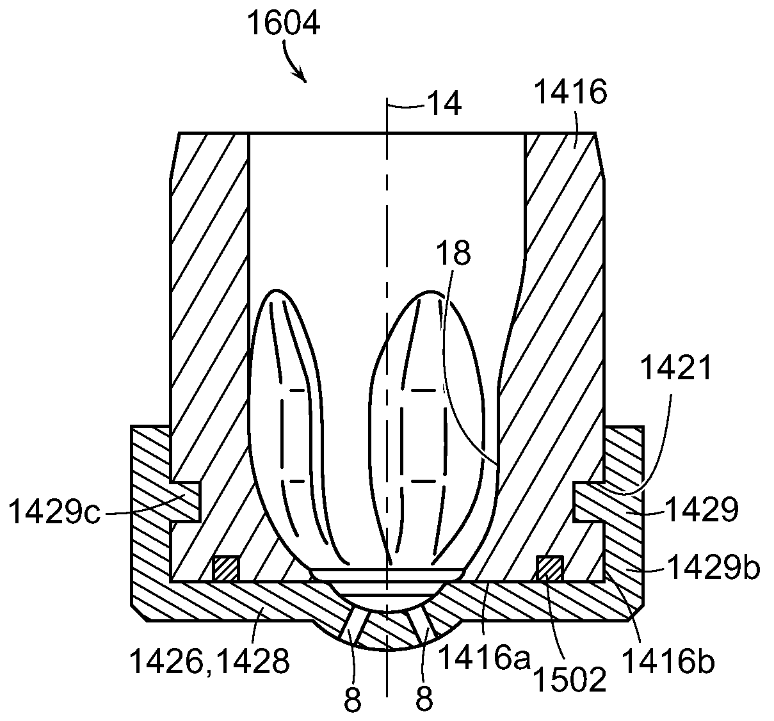
FIG. 22 is a cross-sectional view of another alternative embodiment valve seat.

Referring to FIG. 22, another alternative embodiment valve seat 1604 is similar to the valve seat 1404 illustrated in FIG. 20 except that the inwardly protruding portion 1429*c* is configured to engage with the groove 1421 via a threaded connection or bayonet connection, whereby the insert 1416 is assembled with the base 1416 using a twisting action and/or is secured to the base 1416 via a twist-lock or cam-lock mechanism. In this embodiment, an annular seal 1502 may optionally be provided between the insert 1416 and the base 1416.

Figure 23:
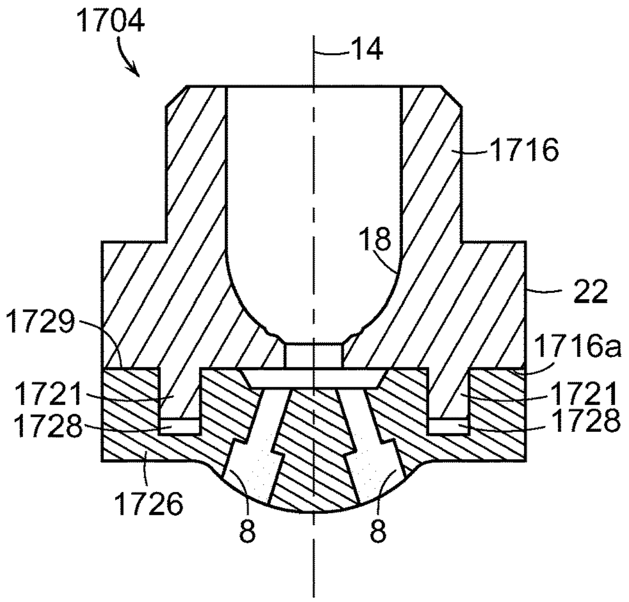
FIG. 23 is a cross-sectional view of another alternative embodiment valve seat.

Referring to FIG. 23, another alternative embodiment valve seat 1704 includes an insert 1726 that is formed separately from the base 1716, and then is assembled with the base 1716 to form the valve seat 1704. The insert 1726 includes one or more spray holes 8 and may be formed of nickel in an electroforming process, but the insert 1726 is not limited to this material or to being formed by an electroforming process. The insert 1726 is a plate that has the same shape and dimensions as the terminal end 1716*a* of the base 1716 and abuts the terminal end 1716*a* of the base 1716. The insert 1726 is retained in the assembled configuration with the base 1716 by being pressed onto features incorporated into the base 1716. For example, in the embodiment illustrated in FIG. 23, the terminal end 1716*a* of the base 1716 includes posts or an annular ring 1721 that protrude in a longitudinal direction from the terminal end 1716*a*. The posts or annular ring 1721 are received in a corresponding opening or openings 1728 formed in the facing surface 1729 of the insert 1726 in a press fit or interference fit.

Figure 24:
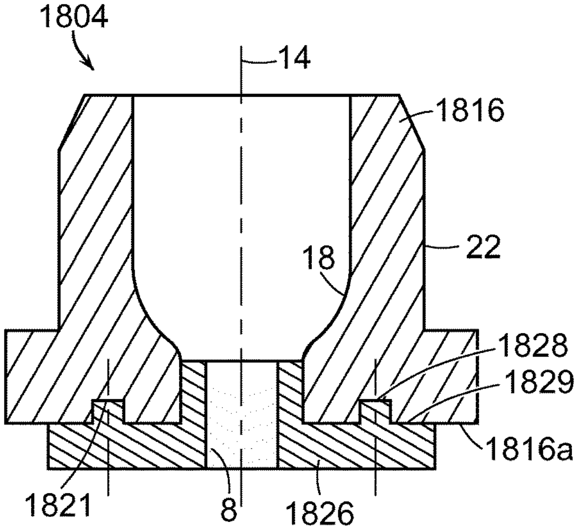
FIG. 24 is a cross-sectional view of another alternative embodiment valve seat.

Referring to FIG. 24, another alternative embodiment valve seat 1804 includes an insert 1826 that is formed separately from the base 1816, and then is assembled with the base 1816 to form the valve seat 1804. The insert 1826 includes one or more spray holes 8 and may be formed of nickel in an electroforming process, but the insert 1826 is not limited to this material or to being formed by an electroforming process. The insert 1826 is a plate that has a peripheral dimension that is less than that of the terminal end 1816*a* of the base 1816 and abuts the terminal end 1816*a* of the base 1816. The insert 1826 is retained in the assembled configuration with the base 1816 by being pressed onto features incorporated into the base 1816. For example, in the embodiment illustrated in FIG. 24, the terminal end 1816*a* of the base 1816 includes an opening or openings 1821, while the facing surface 1829 of the insert 1826 includes posts or an annular ring 1828 that protrude longitudinally toward the base 1816. The base opening or openings 1821 receive the corresponding posts or annular ring 1828 in a press fit or interference fit.

Figure 25:
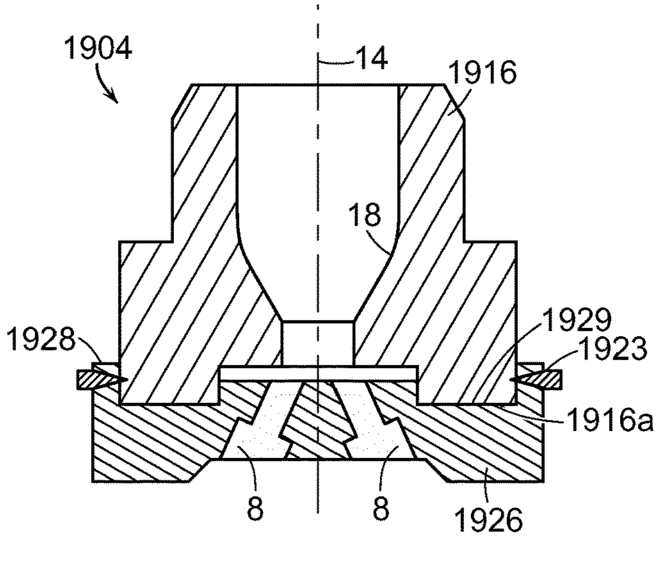
FIG. 25 is a cross-sectional view of another alternative embodiment valve seat.

Referring to FIG. 25, another alternative embodiment valve seat 1904 includes an insert 1926 that is formed separately from the base 1916, and then is assembled with the base 1916 to form the valve seat 1904. The insert 1926 includes one or more spray holes 8 and may be formed of nickel in an electroforming process, but the insert 1926 is not limited to this material or to being formed by an electroforming process. The insert 1926 is a plate that has a peripheral dimension that is greater than that of the terminal end 1916*a* of the base 1916. In addition, a rim 1928 is formed along the peripheral edge of the insert 1926. The rim 1928 protrudes longitudinally toward the base 1916 from the facing surface 1929 of the insert 1926. The insert facing surface 1929 abuts the terminal end 1916*a* of the base 1916, and the terminal end 1916*a* of the base 1916 is received within the rim 1928 in a press fit or tolerance fit. Thus, the insert 1926 is retained in the assembled configuration with the base 1916 by being pressed onto features incorporated into the base 1816. In some embodiments, a weld 1923 may be provided between the rim 1928 and the base 1916 that further ensures that the insert 1926 is retained in the assembled configuration with the base 1916.

Referring to FIG. 26, another alternative embodiment valve seat 2004 includes an insert 2026 that is formed separately from the base 2016, and then is assembled with the base 2016 to form the valve seat 2004. The insert 2026 includes one or more spray holes 8 and may be formed of nickel in an electroforming process, but the insert 2026 is not limited to this material or to being formed by an electroforming process. The insert 2026 is a plate that has a peripheral shape and dimension that is the same as that of the terminal end 2016*a* of the base 2016 and abuts the terminal end 2016*a* of the base 2016. The insert 2026 is retained in the assembled configuration with the base 2016 by being pressed onto features incorporated into the base 2016. For example, in the embodiment illustrated in FIG. 26, the terminal end 2016*a* of the base 2016 includes an opening or openings 2021, while the facing surface 2029 of the insert 2026 includes posts or an annular ring 2028 that protrude longitudinally toward the base 2016. The base opening or openings 2021 receive the corresponding posts or annular ring 2028 in a press fit or interference fit.

Referring to FIG. 27, another alternative embodiment valve seat 2104 includes an insert 2126 that is formed separately from the base 2116, and then is assembled with the base 2116 to form the valve seat 2104. The insert 2126 includes one or more spray holes 8 and may be formed of nickel in an electroforming process, but the insert 2126 is not limited to this material or to being formed by an electroforming process. The insert 2126 is a plate that has a peripheral dimension that is less than that of the terminal end 2116*a* of the base 2116 and abuts the terminal end 2116*a* of the base 2116. The insert 2126 is retained in the assembled configuration with the base 2116 by being pressed onto features incorporated into the base 2116. For example, in the embodiment illustrated in FIG. 27, the terminal end 2116*a* of the base 2116 includes a central opening 2121, while the facing surface 2129 of the insert 2126 includes a central protrusion 2128 that protrudes longitudinally toward the base 2116. The base central opening 2121 receives the insert central protrusion 2128 in a press fit or interference fit. In some embodiments, a weld 2123 may be provided between the peripheral edge 2123 of the insert 2126 and the base terminal end 2116*a* that further ensures that the insert 2126 is retained in the assembled configuration with the base 2116.

Referring to FIG. 28, another alternative embodiment valve seat 2204 includes an insert 2226 that is formed separately from the base 2216, and then is assembled with the base 2216 to form the valve seat 2204. The insert 2226 includes pre-drilled openings 2217, and the spray holes 8 are formed directly on the pre-drilled openings in an electroplating process. In the illustrated embodiment, the insert 2226 is a plate that has a peripheral dimension that is less than that of the terminal end 2216*a* of the base 2216 and abuts the terminal end 2216*a* of the base 2216. The insert 2226 is retained in the assembled configuration with the base 2116 by welds 2223.

Figure 29:
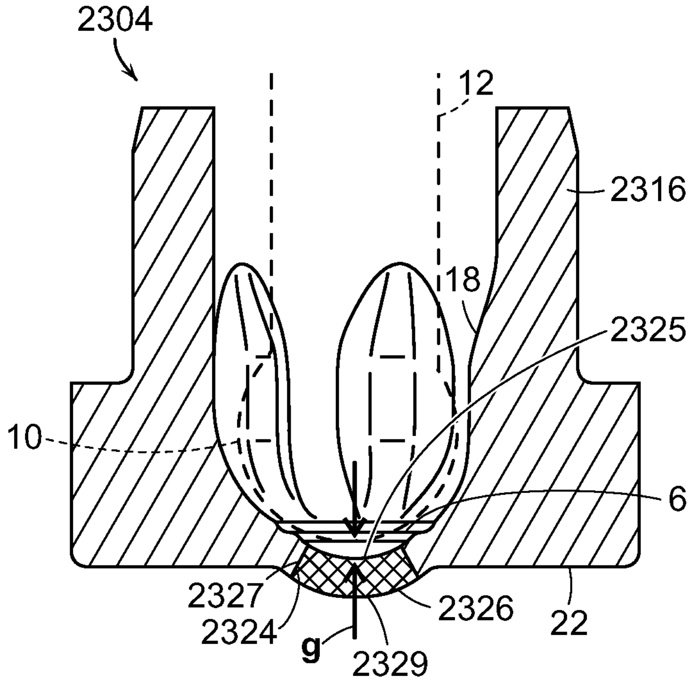
FIG. 29 is a cross-sectional view of another alternative embodiment valve seat.

Referring to FIG. 29, another alternative embodiment valve seat 2304 includes an insert 2326 that is formed separately from the base 2316, and then is assembled with the base 2316 to form the valve seat 2304. The insert 2326 includes one or more spray holes (not shown) and may be formed of nickel in an electroforming process, but the insert 2326 is not limited to this material or to being formed by an electroforming process. The peripheral surface 2327 of the insert 2326 has a tapered outer shape that is complementary to and cooperates with the shaped vacancy 2324 in the base 2316 in order to provide mechanical retention of the insert 2326 within the vacancy 2324. For example, portions of the insert 2326 closer to the inner surface 18 are larger in diameter than portions of the insert 2326 closer to the outer surface 22. In addition, the outward-facing surface 2329 of the insert 2326 is flush with the terminal end 2316*a* of the base 2316. The insert 2326 does not include the seal line 6. Moreover, the insert 2326 has a concave inward facing surface 2325 that provides a gap g between the insert 2326 and the valve body 10 when the valve body is in the first (seated) position. The gap g may result in reduced coke formation during injector use. In some embodiments, a weld (not shown) may be provided between the periphery of the insert 2326 and the base 2316 that further ensures that the insert 2326 is retained in the assembled configuration with the base 2316.

Figure 30:
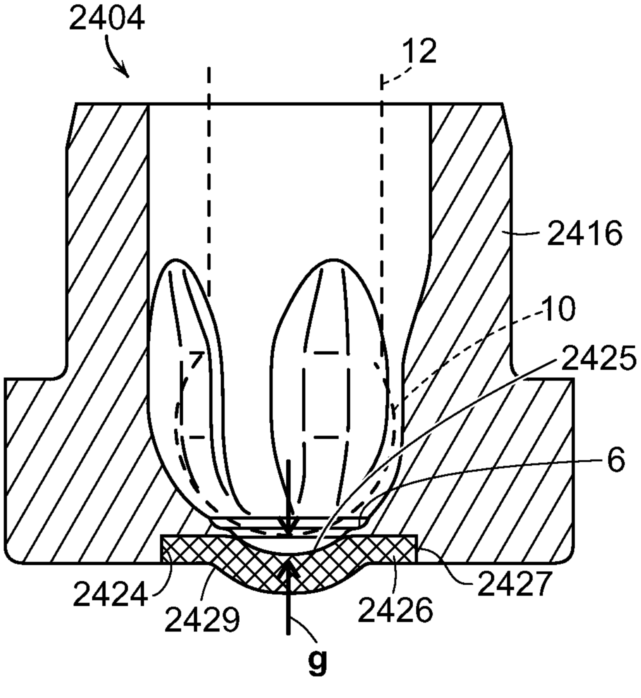
FIG. 30 is a cross-sectional view of another alternative embodiment valve seat.

Referring to FIG. 30, another alternative embodiment valve seat 2404 includes an insert 2426 that is formed separately from the base 2416, and then is assembled with the base 2416 to form the valve seat 2404. The insert 2426 includes one or more spray holes (not shown) and may be formed of nickel in an electroforming process, but the insert 2426 is not limited to this material or to being formed by an electroforming process. The peripheral surface 2427 of the insert 2426 has a shape and dimensions that are complementary to and cooperate with the shape and dimensions of the vacancy 2424 in the base 2416 in order to provide mechanical retention of the insert 2426 within the vacancy 2424. For example, the insert 2426 may be retained within the vacancy 2424 via a press fit or tolerance fit. In addition, the outward-facing surface 2429 of the insert 2426 is flush with the terminal end 2416*a* of the base 2416. The insert 2426 does not include the seal line 6. Moreover, the insert 2426 has a concave inward facing surface 2425 that provides a gap g between the insert 2426 and the valve body 10 when the valve body is in the first (seated) position. The gap g may result in reduced coke formation during injector use. In some embodiments, a weld (not shown) may be provided between the periphery of the insert 2426 and the base 2416 that further ensures that the insert 2426 is retained in the assembled configuration with the base 2416.

Figure 31:
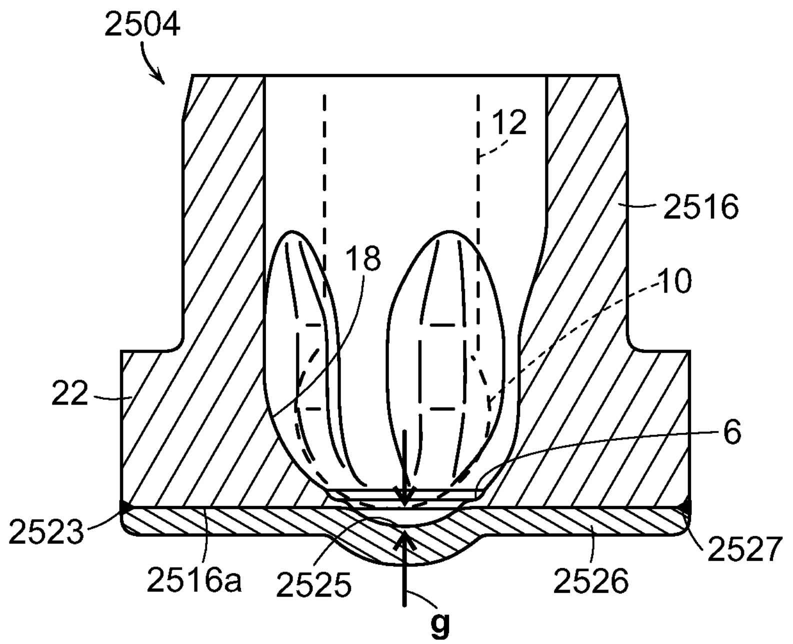
FIG. 31 is a cross-sectional view of another alternative embodiment valve seat.

Referring to FIG. 31, another alternative embodiment valve seat 2504 includes an insert 2526 that is formed separately from the base 2516, and then is assembled with the base 2516 to form the valve seat 2504. The insert 2526 includes one or more spray holes (not shown) and may be formed of nickel in an electroforming process, but the insert 2526 is not limited to this material or to being formed by an electroforming process. The insert 2526 is a plate that abuts the terminal end face 2516*a* of the base 2516, and a peripheral edge 2527 of the insert 2526 has a shape and dimensions that are the same as the shape and dimensions of the terminal end face 2516*a* of the base 2516. In this embodiment, the insert 2526 may be retained on the terminal end face 2516*a* of the base 2516 via a weld 2523. In the embodiment illustrated in FIG. 29, the insert 2526 does not include the seal line 6. Moreover, the insert 2526 has a concave recess 2525 that provides a gap g between the insert 2526 and the valve body 10 when the valve body is in the first (seated) position. The gap g may result in reduced coke formation during injector use.

Figure 32:
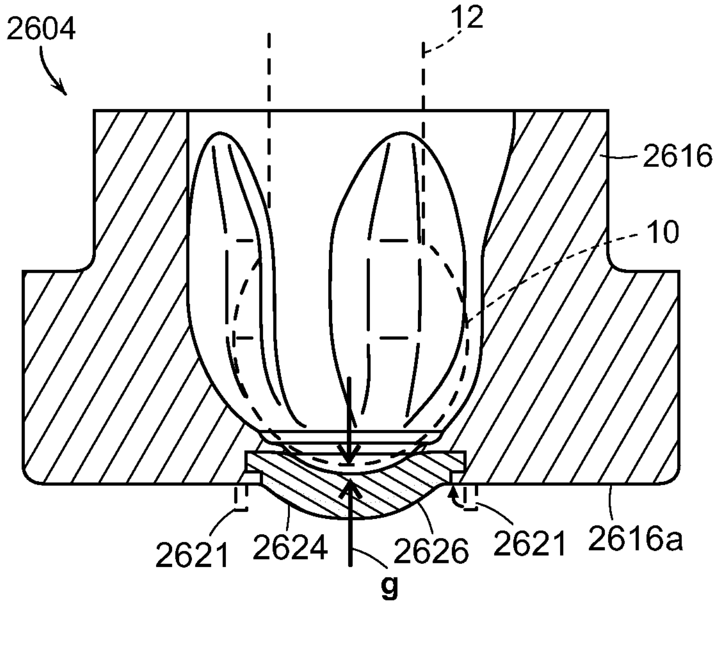
FIG. 32 is a cross-sectional view of another alternative embodiment valve seat.

Referring to FIG. 32, another alternative embodiment valve seat 2604 includes an insert 2626 that is formed separately from the base 2616, and then is assembled with the base 2616 to form the valve seat 2604. The insert 2626 includes one or more spray holes (not shown) and may be formed of nickel in an electroforming process, but the insert 2626 is not limited to this material or to being formed by an electroforming process. The insert 2626 is assembled with the base 2616 by inserting the insert 2626 into a vacancy 2624 of the base 2616 having a shape and dimensions complimentary to that of the insert 2626. Following insertion of the insert 2626 into the vacancy 2624, a staking process is applied to the terminal end surface 2616*a* of the base 2616 along the periphery of the vacancy 2624. For example, in some embodiments a punch (not shown) is driven into the surface 2616*a*, resulting in portions of the terminal end surface 2616*a* being deformed over an outer surface of the insert 2626. In another example, in the illustrated embodiment, tabs 2621 that protrude outward from the terminal end surface 2616*a* may be deformed so as to fold over the outer surface of the insert 2626 (indicated by arrows in the figure). Thus, the insert 2626 is retained in the assembled configuration with the base 2616 via the deformed portions of the base 2616.

In the embodiment illustrated in FIG. 32, the insert 2626 includes the seal line 6. Moreover, the insert 2626 has a concave inward facing surface 2625 that provides a gap g between the insert 2626 and the valve body 10 when the valve body is in the first (seated) position. The gap g may result in reduced coke formation during injector use.

Figure 33:
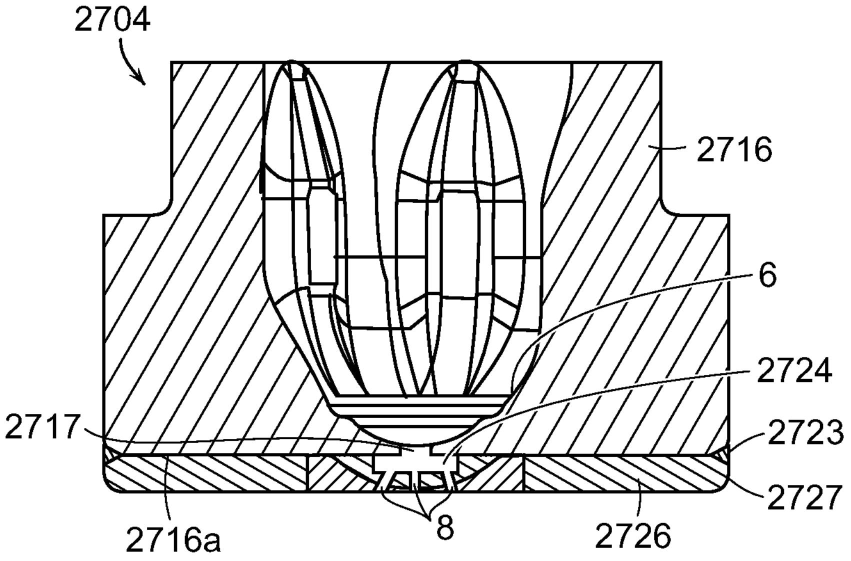
FIG. 33 is a cross-sectional view of another alternative embodiment valve seat.

Referring to FIG. 33, another alternative embodiment valve seat 2704 includes an insert 2726 that is formed separately from the base 2716, and then is assembled with the base 2716 to form the valve seat 2704. The insert 2726 includes one or more spray holes 8 and may be formed of nickel in an electroforming process, but the insert 2726 is not limited to this material or to being formed by an electroforming process. The insert 2726 is a plate that abuts the terminal end face 2716*a* of the base 2716, and a peripheral edge 2727 of the insert 2726 has a shape and dimensions that are the same as the shape and dimensions of the terminal end face 2716*a* of the base 2716. In this embodiment, the insert 2726 may be retained on the terminal end face 2716*a* of the base 2716 via a weld 2723. The insert 2726 does not include the seal line 6. Moreover, the insert 2726 does not have the concave recess that provides a gap g between the insert 2726 and the valve body 10 when the valve body is in the first (seated) position since the insert 2726 is flat on both sides. However, the insert 2726 and the base 2716 are configured to provide a manifold vacancy 2724 disposed adjacent to the valve seat inner surface 18. For example, the manifold vacancy 2724 may include a recess 2728 that is formed in a base-facing surface of the insert 2726 that has a larger dimension than a predrilled opening 2717 of the base 2716. The manifold vacancy 2724 communicates with each spray hole 8, and, in a manner similar to the gap g, may result in reduced coke formation during injector use.

Figure 34:
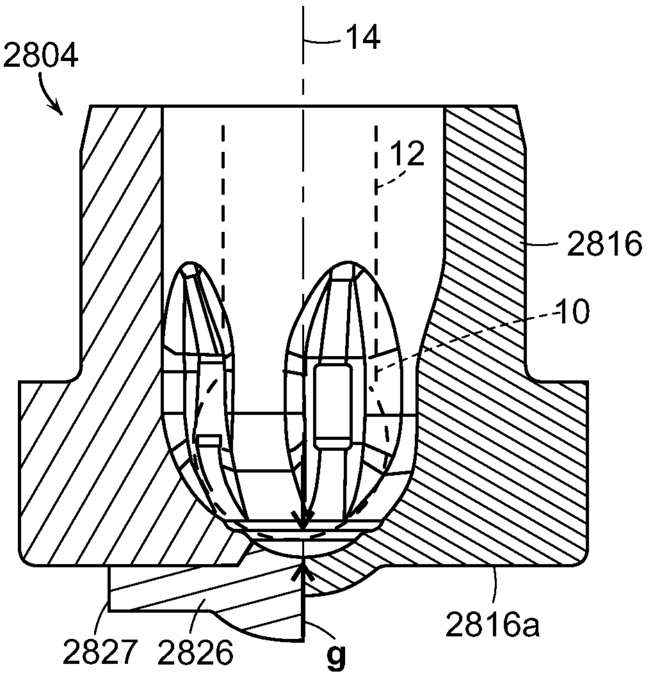
FIG. 34 is a cross-sectional view of another alternative embodiment valve seat.

Referring to FIG. 34, another alternative embodiment valve seat 2804 includes an insert 2826 that is formed separately from the base 2816, and then is assembled with the base 2816 to form the valve seat 2804. In the figure, although the insert 2826 is symmetric about the longitudinal axis 14, only half the insert 2826 is shown. The insert 2826 includes one or more spray holes (not shown) and may be formed of nickel in an electroforming process, but the insert 2826 is not limited to this material or to being formed by an electroforming process. The insert 2826 is a plate that has a peripheral dimension that is less than that of the terminal end 2816*a* of the base 2816 and abuts the terminal end 2816*a* of the base 2816, whereby the insert 2826 protrudes outward relative to the terminal end 2816*a* of the base 2816. The insert 2826 is retained in the assembled configuration with the base 2816 by one or more of the structures or methods previously described, including via an interference fit, welding, threaded engagement, staking or other deformation, etc. The insert 2626 does not include the seal line 6. In addition, the insert 2826 has a concave inward facing surface 2825 that provides a gap g between the insert 2826 and the valve body 10 when the valve body 10 is in the first (seated) position. The gap g may result in reduced coke formation during injector use.

Figure 35:
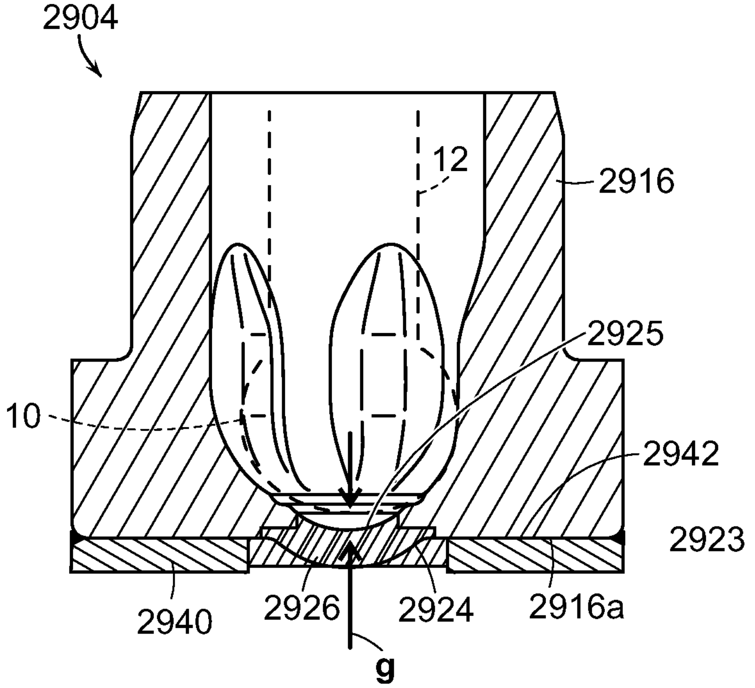
FIG. 35 is a cross-sectional view of another alternative embodiment valve seat.

Referring to FIG. 35, another alternative embodiment valve seat 2904 includes an insert 2926 that is formed separately from the base 2916, and then is assembled with the base 2916 using a retainer 2940 to form the valve seat 2904. The insert 2926 includes one or more spray holes (not shown) and may be formed of nickel in an electroforming process, but the insert 2926 is not limited to this material or to being formed by an electroforming process. The insert 2926 is disposed in a vacancy 2924 in the base 2916. The peripheral surface 2927 of the insert 2926 has a shape and dimensions that are complementary to those of the vacancy 2924. In some embodiments, the insert 2926 may be retained within the vacancy 2924 via a press fit or tolerance fit. The retainer 2940 is used to further ensure that the insert 2926 is securely retained within the vacancy 2924. The retainer 2940 surrounds, and is secured to a periphery of the insert 2926 for example by welding. The retainer 2940 has a valve seat-facing surface 2942 that abuts the terminal end 2916*a* of the base 2916 and is mechanically connected thereto, for example by welding (see weld 2923). In addition, the insert 2926 has a concave inward facing surface 2925 that provides a gap g between the insert 2926 and the valve body 10 when the valve body 10 is in the first (seated) position. The gap g may result in reduced coke formation during injector use.

Figure 36:
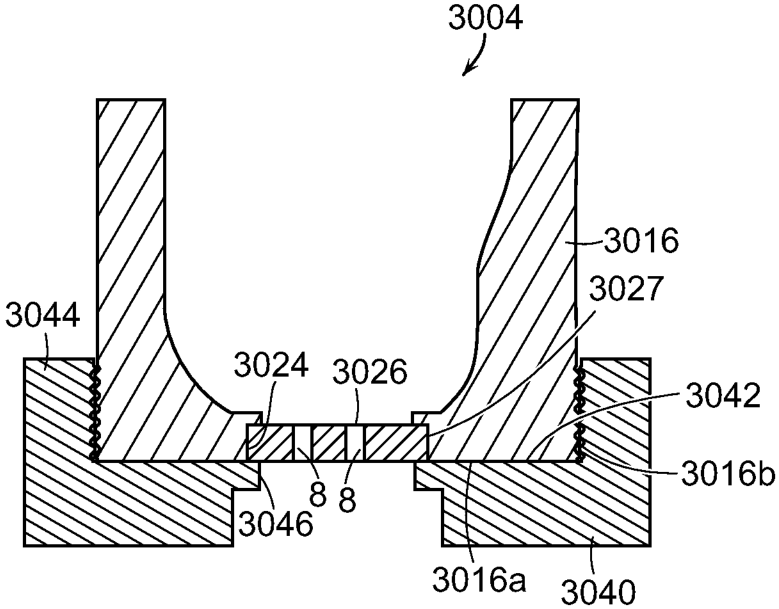
FIG. 36 is a cross-sectional view of another alternative embodiment valve seat.

Referring to FIG. 36, another alternative embodiment valve seat 3004 includes an insert 3026 that is formed separately from the base 3016, and then is assembled with the base 3016 using a retainer 3040 to form the valve seat 3004. The insert 3026 includes one or more spray holes 8 and may be formed of nickel in an electroforming process, but the insert 3026 is not limited to this material or to being formed by an electroforming process. The insert 3026 is a flat plate that is disposed in a vacancy 3024 in the base 3016. The peripheral surface 3027 of the insert 3026 has a shape and dimensions that are complementary to those of the vacancy 3024. In some embodiments, the insert 3026 may be retained within the vacancy 3024 via a press fit or tolerance fit. The retainer 3040 is used to further ensure that the insert 3026 is securely retained within the vacancy 3024. The retainer 3040 includes an end face 3042 that abuts the base terminal end 3016*a* and has a central opening 3046. The central opening 3046 is dimensioned to be sufficiently large to permit fluid emission and sufficiently small to allow the retainer 3040 to retain the insert 3026 within the vacancy 3024. The retainer 3040 includes a sidewall 3044 that protrudes from the end face 3042 and that surrounds and overlies a portion of the lateral side 3016*b* of the base 3016, and is secured to the lateral side 3016*b* for example by a screw thread interface (shown), a cam lock interface (not shown), a bayonet interface (not shown) or other twist locking interface.

Figure 37:
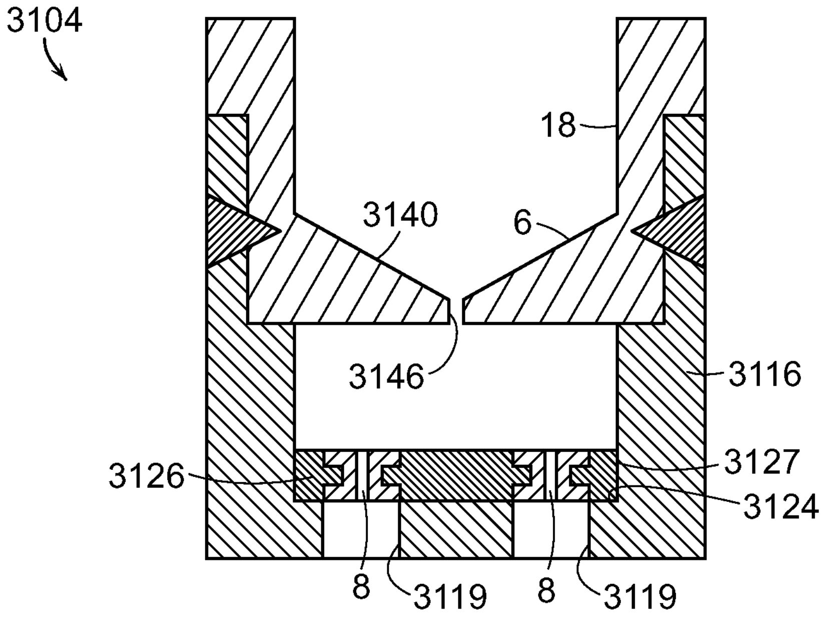
FIG. 37 is a cross-sectional view of another alternative embodiment valve seat.

Referring to FIG. 37, another alternative embodiment valve seat 3104 includes an insert 3126 that is formed separately from the base 3116, and then is assembled with the base 3116 using a retainer 3140 to form the valve seat 3104. The insert 3126 is a flat plate having pre-drilled holes onto which spray holes 8 have been formed by electroplating. The insert 3126 is disposed in a vacancy 3124 in the base 3116. The peripheral surface 3127 of the insert 3126 has a shape and dimensions that are complementary to those of the vacancy 3124. The base 3116 includes pre-drilled holes 3119 that are aligned with the spray holes 8, whereby fuel can exit the fuel injector 1. In some embodiments, the insert 3126 may be retained within the vacancy 3124 via a press fit or tolerance fit. The retainer 3140 is used to further ensure that the insert 3126 is securely retained within the vacancy 3124. The retainer 3140 may be an annular member that is welded to the base inner surface 18 at a location inward relative to the insert 3126. The retainer 3140 may define the valve seat and seal line 6, and also includes a central opening 3146 through which the fluid passes to the spray holes 8.

Figure 38:
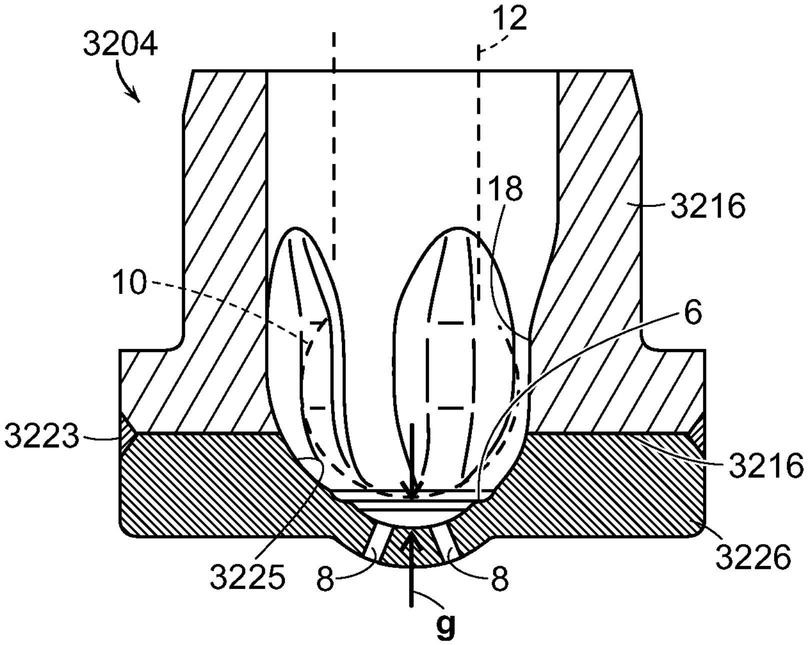
FIG. 38 is a cross-sectional view of another alternative embodiment valve seat.

Referring to FIG. 38, another alternative embodiment valve seat 3204 includes an insert 3226 that is formed separately from the base 3216, and then is assembled with the base 3216 to form the valve seat 3204. The insert 3226 includes one or more spray holes 8 and may be formed of nickel in an electro forming process, but the insert 3226 is not limited to this material or to being formed by an electroforming process. The insert 3226 is a plate that abuts the terminal end face 3216*a* of the base 3216, and a peripheral edge 3227 of the insert 3226 has a shape and dimensions that are the same as the shape and dimensions of the terminal end face 3216*a* of the base 3216. In this embodiment, the insert 3226 may be retained on the terminal end face 3216*a* of the base 3216 via a weld 3223. In this embodiment, the base 3216 has been truncated sufficiently that the insert inner surface 3225 defines the valve seat and includes the seal line 6. In addition, the insert inner surface 3225 includes a concavity that provides a gap g between the insert 3226 and the valve body 10 when the valve body is in the first (seated) position. The gap g may result in reduced coke formation during injector use.

Figure 39:
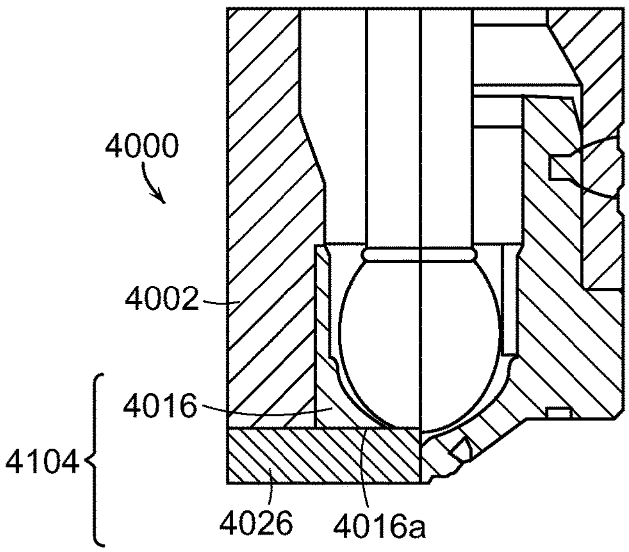
FIG. 39 is a cross-sectional view of an injector that illustrates both a conventional injector configuration (right side of image) and an alternative embodiment injector configuration (left side of image).

Referring to FIG. 39, the injector 4000 includes an alternative valve seat 4004 in which the tubular housing 4002 extends further longitudinally toward the valve seat terminal end 4016*a* than in previous embodiments. In this figure, the right hand side of the image represents a conventional injector configuration, while the left hand side of the image represents the injector 4000. In the injector 4000, the base 4016 is surrounded by the housing 4002, and the insert 4026 (spray holes not shown) is fixed to the terminal end 4016*a* of the base 4016 and to the housing 4002. The insert 4026 is illustrated schematically, and may be configured using features of any of the previous embodiments, or a combination thereof.

Figure 40:
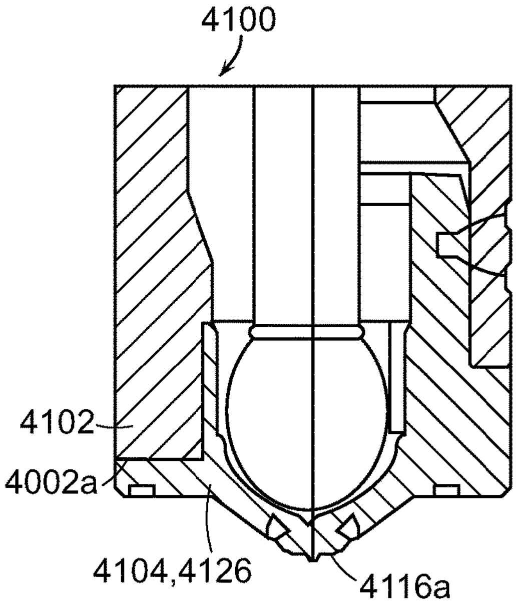
FIG. 40 is a cross-sectional view of an injector that illustrates both a conventional injector configuration (right side of image) and another alternative embodiment injector configuration (left side of image).

Referring to FIG. 40, the injector 4100 includes an alternative valve seat 4104 in which the tubular housing 4102 extends further longitudinally toward the valve seat terminal end 4116*a* than in previous embodiments. In this figure, the right hand side of the image represents a conventional injector configuration, while the left hand side of the image represents the injector 4100. In the injector 4100, the base is omitted, and the insert 4126 provides the valve seat including the seal line 6 as well as the spray holes (not shown). The insert 4126 is fixed to the terminal end 4002*a* of the housing 4102. The insert 4126 is not limited to the configuration shown and may be configured using features of any of the previous embodiments, or a combination thereof.

Figure 41:
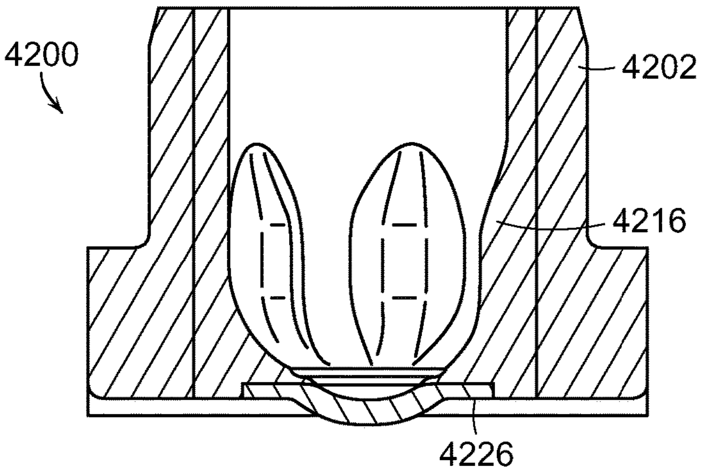
FIG. 41 is a cross-sectional view of a fuel injector including a conventional valve seat.

Referring to FIG. 41, the injector 4200 includes an alternative valve seat 4204 in which the tubular housing 4202 extends to the terminal end of the injector 4200. In the injector 4200, the base 4216 and the insert 4226 are surrounded by the housing 4202, and the insert 4026 (spray holes not shown) is fixed to the terminal end 4216*a* of the base 4216. In some embodiments, the base 4216 may be press fit into the housing 4202. The insert 4226 is not limited to the configuration shown and may be configured using features of any of the previous embodiments, or a combination thereof. The assembly shown in FIG. 41 cam be made from multiple, simple components.

Although the valve seat base (all embodiments) is described here as being manufactured by a metal injection molding process, the valve seat base is not limited to being manufactured by this process. For example, in some embodiments the valve seat base may be forged or machined. The material used to form the valve seat base is limited only by the requirements of the specific application.

Although the insert (all embodiments) is described here as being formed of metal, the insert is not limited to being formed of metal and may alternatively be made from non-metals, for example plastic or ceramic.

The features described herein with respect to FIGS. 1-41 may be used individually or in combination to form a high pressure fuel injector having a reliable fixed connection between the valve seat base and the valve seat insert.

Selective illustrative embodiments of the fuel injector and valve seat are described above in some detail. It should be understood that only structures considered necessary for clarifying the fuel injector and valve seat have been described herein. Other conventional structures, and those of ancillary and auxiliary components of the fuel injector and valve seat, are assumed to be known and understood by those skilled in the art. Moreover, while a working example of the fuel injector and valve seat have been described above, the fuel injector and valve seat are not limited to the working examples described above, but various design alterations may be carried out without departing from the fuel injector and valve seat as set forth in the claims.

We claim:

1. A fuel injector comprising a fuel injector housing;

a valve seat disposed in the fuel injector housing, the valve seat including a base that is mechanically connected to an end of the fuel injector housing and includes an inner surface, and an insert that cooperates with the base to define a spray hole that extends between the inner surface and an exterior of the valve seat; and a valve body disposed in the fuel injector housing and operable to move along a longitudinal axis of the fuel injector housing between a first position in which the valve body abuts the inner surface and in which fluid is prevented from passing through the spray hole, and a second position in which the valve body is spaced apart from the inner surface and in which fluid is permitted to pass through the spray hole, wherein a surface of the insert includes surface features that engage with corresponding surface features formed on a surface of the base so as to retain the insert in a predetermined rotational orientation about the longitudinal axis relative to the base, the insert has a polygonal peripheral shape when viewed in a cross section that is transverse to the longitudinal axis, a corner of the polygonal peripheral shape of the insert corresponding to one of the surface features of the insert, and the insert is disposed in a vacancy of the base that has a corresponding peripheral shape, a corner of the polygonal peripheral shape of the vacancy corresponding to one of the surface features of the base.

2. A fuel injector comprising:

a fuel injector housing a valve seat disposed in the fuel injector housing, the valve seat including a base that is mechanically connected to an end of the fuel injector housing and includes a concave inner surface, and an insert that cooperates with the base to define a spray hole that extends between the concave inner surface and an exterior of the valve seat; and a valve body disposed in the fuel injector housing and operable to move along a longitudinal axis of the fuel injector housing between a first position in which the valve body abuts the concave inner surface and in which fluid is prevented from passing through the spray hole, and a second position in which the valve body is spaced apart from the concave inner surface and in which fluid is permitted to pass through the spray hole; wherein a surface of the insert includes surface features that engage with corresponding surface features formed on a surface of the base so as to retain the insert in an assembled configuration with and in direct contact with the base, and the insert is received within a vacancy that is formed in the base, and wherein the surface features of the insert include a clip portion that engages the corresponding surface features formed on the surface of the base, and the corresponding surface features formed on the surface of the base include one of a shoulder, a groove, a recess and a protrusion.

* * * * *